US009199185B2

(12) United States Patent
Verdegan et al.

(10) Patent No.: US 9,199,185 B2
(45) Date of Patent: Dec. 1, 2015

(54) SURFACE COALESCERS

(75) Inventors: Barry M. Verdegan, Stoughton, WI (US); Brian Schwandt, Fort Atkinson, WI (US); Soondeuk Jeung, Cookeville, TN (US); Mark T. Wieczorek, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 752 days.

(21) Appl. No.: 12/780,392

(22) Filed: May 14, 2010

(65) Prior Publication Data

US 2011/0124941 A1 May 26, 2011

Related U.S. Application Data

(60) Provisional application No. 61/178,738, filed on May 15, 2009, provisional application No. 61/179,170, filed on May 18, 2009, provisional application No. 61/179,939, filed on May 20, 2009.

(51) Int. Cl.
*B01D 69/02* (2006.01)
*B01D 69/06* (2006.01)
*B01D 69/12* (2006.01)
*B01D 71/48* (2006.01)
*B01D 17/04* (2006.01)

(52) U.S. Cl.
CPC .................................. *B01D 17/045* (2013.01)

(58) Field of Classification Search
None
See application file for complete search history.

(56) References Cited

U.S. PATENT DOCUMENTS

| | | | |
|---|---|---|---|
| 3,228,527 A | 1/1966 | McPherson | |
| 3,390,780 A | 7/1968 | Bennett | |
| 3,934,372 A | 1/1976 | Diehn et al. | |
| 3,950,289 A | 4/1976 | D'Amato et al. | |
| 3,951,814 A | 4/1976 | Krueger | |
| 3,956,534 A | 5/1976 | Brown et al. | |
| 3,957,365 A | 5/1976 | Croft | |
| 3,960,719 A | 6/1976 | Bresson | |
| 3,973,717 A | 8/1976 | Jensen | |
| 4,031,261 A | 6/1977 | Durst | |
| 4,039,441 A | 8/1977 | Fett | |
| 4,047,946 A | 9/1977 | Croft | |
| 4,052,316 A | 10/1977 | Berger, Jr. et al. | |
| 4,078,965 A | 3/1978 | Berger, Jr. et al. | |
| 4,081,373 A | 3/1978 | Rozniecki | |
| 4,083,778 A | 4/1978 | McGrew | |
| 4,199,447 A | 4/1980 | Chambers et al. | |
| 4,210,697 A * | 7/1980 | Adiletta | 442/87 |
| 4,213,863 A | 7/1980 | Anderson | |
| 4,229,297 A * | 10/1980 | Nohmi et al. | 210/654 |
| 4,229,838 A | 10/1980 | Mano | |
| 4,241,108 A | 12/1980 | Tracy et al. | |
| 4,251,369 A | 2/1981 | Casad et al. | |
| 4,304,671 A | 12/1981 | Labaquere | |
| 4,340,276 A | 7/1982 | Maffitt et al. | |
| 4,372,847 A | 2/1983 | Lewis | |
| 4,457,845 A | 7/1984 | Robertson | |
| 4,553,504 A | 11/1985 | Druggal et al. | |
| 4,576,862 A | 3/1986 | Lee et al. | |
| 4,578,898 A | 4/1986 | Greenbaum | |
| 4,622,821 A | 11/1986 | Madden | |
| 4,640,781 A | 2/1987 | Hughes | |
| 4,643,834 A | 2/1987 | Batutis | |
| 4,756,823 A | 7/1988 | O'Neill et al. | |
| 4,759,782 A | 7/1988 | Miller et al. | |
| 4,790,947 A | 12/1988 | Arnold | |
| 4,863,643 A | 9/1989 | Cochran | |
| 4,888,117 A | 12/1989 | Brown et al. | |
| 4,954,297 A | 9/1990 | Beery et al. | |
| 4,976,993 A | 12/1990 | Sutera | |
| 5,006,260 A | 4/1991 | Roques et al. | |
| 5,037,454 A | 8/1991 | Mann | |
| 5,062,927 A | 11/1991 | Stout | |
| 5,068,035 A | 11/1991 | Mohr | |
| 5,080,802 A | 1/1992 | Cairo, Jr. et al. | |
| 5,112,498 A | 5/1992 | Davies | |
| 5,156,745 A | 10/1992 | Cairo, Jr. et al. | |
| 5,174,907 A | 12/1992 | Chown et al. | |
| 5,223,031 A | 6/1993 | Sugi et al. | |
| 5,242,604 A | 9/1993 | Young et al. | |
| 5,244,574 A | 9/1993 | Gatt et al. | |
| 5,275,729 A | 1/1994 | Gris | |
| 5,320,909 A | 6/1994 | Scharman et al. | |
| 5,376,183 A | 12/1994 | Gatt et al. | |

(Continued)

FOREIGN PATENT DOCUMENTS

| | | |
|---|---|---|
| CN | 1684752 A | 10/2005 |
| CN | 101185818 A | 5/2008 |
| CN | 101687128 | 3/2010 |
| RU | 1813498 | 5/1993 |
| RU | 2371235 | 10/2009 |
| SU | 1761201 | 9/1992 |
| WO | WO-2010/042706 | 4/2010 |

OTHER PUBLICATIONS

International Search Report for PCT/US2011/031259 dated Oct. 28, 2011.
Written Opinion for PCT/US2011/031259 dated Oct. 28, 2011.
International Preliminary Report on Patentability for PCT/US2010/034922 dated Feb. 9, 2012.

(Continued)

*Primary Examiner* — Randy Boyer
(74) *Attorney, Agent, or Firm* — Foley & Lardner LLP

(57) ABSTRACT

Disclosed are coalescers, systems, and methods for coalescing a mixture of two phases, namely a continuous phase and a dispersed phase. The disclosed coalescers, systems, and methods include or utilize one or more layers of media material having a distinct mean pore size and wettability. The disclosed coalescers, systems, and methods are effective for removing the dispersed phase from the mixture.

26 Claims, 8 Drawing Sheets

(56) References Cited

U.S. PATENT DOCUMENTS

| | | | |
|---|---|---|---|
| 5,401,404 A | 3/1995 | Strauss | |
| 5,401,413 A | 3/1995 | Gatt et al. | |
| 5,417,848 A | 5/1995 | Erdmannsdorfer et al. | |
| 5,439,588 A | 8/1995 | Chown et al. | |
| 5,443,724 A * | 8/1995 | Williamson et al. | 210/323.2 |
| 5,450,835 A | 9/1995 | Wagner | |
| 5,454,937 A | 10/1995 | Lewandowski | |
| 5,454,945 A | 10/1995 | Spearman | |
| 5,468,358 A | 11/1995 | Ohkawa et al. | |
| 5,468,382 A | 11/1995 | Cook et al. | |
| 5,468,385 A | 11/1995 | Inoue | |
| 5,480,547 A | 1/1996 | Williamson et al. | |
| 5,494,629 A | 2/1996 | Gorden et al. | |
| 5,500,132 A | 3/1996 | Elmi | |
| 5,510,112 A | 4/1996 | Gatt et al. | |
| 5,562,888 A | 10/1996 | Rajadurai | |
| 5,565,078 A | 10/1996 | Sams et al. | |
| 5,574,530 A | 11/1996 | Sanada | |
| 5,575,896 A | 11/1996 | Sams et al. | |
| 5,576,047 A | 11/1996 | Margolis | |
| 5,580,692 A | 12/1996 | Lofftus et al. | |
| 5,616,244 A | 4/1997 | Seureau et al. | |
| 5,622,101 A | 4/1997 | Margolis | |
| 5,629,367 A | 5/1997 | Lofftus et al. | |
| 5,631,919 A | 5/1997 | Intermill et al. | |
| 5,643,431 A | 7/1997 | Sams et al. | |
| 5,656,166 A | 8/1997 | Linnersten et al. | |
| 5,656,173 A | 8/1997 | Jordan et al. | |
| 5,669,366 A | 9/1997 | Beach et al. | |
| 5,750,024 A | 5/1998 | Spearman | |
| 5,762,810 A | 6/1998 | Pelton et al. | |
| 5,800,597 A | 9/1998 | Perrotta et al. | |
| 5,837,310 A | 11/1998 | Margolis et al. | |
| 5,861,087 A | 1/1999 | Manning | |
| 5,874,008 A | 2/1999 | Hirs | |
| RE36,173 E | 3/1999 | Margolis | |
| 5,879,556 A | 3/1999 | Hein | |
| 6,017,300 A | 1/2000 | Herman | |
| 6,019,717 A | 2/2000 | Herman | |
| 6,056,128 A | 5/2000 | Glasgow | |
| 6,060,410 A * | 5/2000 | Gillberg-LaForce et al. | 442/118 |
| 6,083,380 A | 7/2000 | Selby et al. | |
| 6,099,729 A | 8/2000 | Cella et al. | |
| 6,123,061 A | 9/2000 | Baker et al. | |
| 6,139,595 A | 10/2000 | Herman et al. | |
| 6,149,408 A | 11/2000 | Holt | |
| 6,171,488 B1 | 1/2001 | Morse et al. | |
| 6,251,168 B1 | 6/2001 | Birmingham et al. | |
| 6,281,264 B1 | 8/2001 | Salovey et al. | |
| 6,290,738 B1 | 9/2001 | Holm | |
| 6,302,932 B1 | 10/2001 | Unger et al. | |
| 6,312,505 B1 | 11/2001 | McQuigg et al. | |
| 6,332,987 B1 | 12/2001 | Whitney et al. | |
| 6,337,008 B1 | 1/2002 | Christensen et al. | |
| 6,354,283 B1 | 3/2002 | Hawkins et al. | |
| 6,358,416 B1 | 3/2002 | Miller et al. | |
| 6,416,657 B1 | 7/2002 | Fersing et al. | |
| 6,419,721 B1 | 7/2002 | Hunter | |
| 6,422,396 B1 | 7/2002 | Li et al. | |
| 6,449,947 B1 | 9/2002 | Liu et al. | |
| 6,517,615 B2 | 2/2003 | Miller et al. | |
| 6,530,978 B2 | 3/2003 | McQuigg et al. | |
| 6,533,935 B2 | 3/2003 | Miller et al. | |
| 6,534,196 B2 | 3/2003 | Betts | |
| 6,540,816 B2 | 4/2003 | Allie et al. | |
| 6,544,449 B1 | 4/2003 | Gardner | |
| 6,569,330 B1 | 5/2003 | Sprenger et al. | |
| 6,579,438 B2 | 6/2003 | Creber et al. | |
| 6,582,490 B2 | 6/2003 | Miller et al. | |
| 6,601,385 B2 | 8/2003 | Verdegan et al. | |
| 6,605,224 B2 | 8/2003 | Aymong | |
| 6,610,198 B1 | 8/2003 | Jiang et al. | |
| 6,640,792 B2 | 11/2003 | Harvey et al. | |
| 6,641,742 B2 | 11/2003 | Prater et al. | |
| 6,683,783 B1 | 1/2004 | Smalley et al. | |
| 6,716,349 B2 | 4/2004 | Baracchi et al. | |
| 6,722,123 B2 | 4/2004 | Liu et al. | |
| 6,730,236 B2 | 5/2004 | Kouba | |
| 6,740,358 B2 | 5/2004 | Speece, Jr. et al. | |
| 6,749,827 B2 | 6/2004 | Smalley et al. | |
| 6,758,980 B2 | 7/2004 | Prater et al. | |
| 6,764,598 B2 | 7/2004 | Yu et al. | |
| 6,767,459 B1 | 7/2004 | Sinker et al. | |
| 6,811,693 B2 | 11/2004 | Nilsen et al. | |
| 6,884,349 B1 | 4/2005 | Jiang | |
| 6,907,997 B2 | 6/2005 | Thacker et al. | |
| 6,936,233 B2 | 8/2005 | Smalley et al. | |
| 6,946,012 B1 | 9/2005 | Miller et al. | |
| 6,949,237 B2 | 9/2005 | Smalley et al. | |
| 6,979,709 B2 | 12/2005 | Smalley et al. | |
| 6,986,876 B2 | 1/2006 | Smalley et al. | |
| 7,008,604 B2 | 3/2006 | Smalley et al. | |
| 7,041,620 B2 | 5/2006 | Smalley et al. | |
| 7,048,262 B2 | 5/2006 | Cheng | |
| 7,048,999 B2 | 5/2006 | Smalley et al. | |
| 7,071,406 B2 | 7/2006 | Smalley et al. | |
| 7,087,207 B2 | 8/2006 | Smalley et al. | |
| 7,105,596 B2 | 9/2006 | Smalley et al. | |
| 7,108,841 B2 | 9/2006 | Smalley et al. | |
| 7,189,335 B1 | 3/2007 | Dalzell et al. | |
| 7,198,718 B1 | 4/2007 | Turnbull | |
| 7,205,069 B2 | 4/2007 | Smalley et al. | |
| 7,211,226 B2 | 5/2007 | Liu et al. | |
| 7,211,320 B1 | 5/2007 | Cooper et al. | |
| 7,235,124 B2 | 6/2007 | Liu et al. | |
| 7,235,177 B2 | 6/2007 | Herman et al. | |
| 7,238,216 B2 | 7/2007 | Malgorn et al. | |
| 7,250,126 B2 | 7/2007 | Haberkamp et al. | |
| 7,258,719 B2 | 8/2007 | Miller et al. | |
| 7,279,319 B2 | 10/2007 | Cheng | |
| 7,285,209 B2 | 10/2007 | Yu et al. | |
| 7,297,256 B2 | 11/2007 | Loftis et al. | |
| 7,297,279 B2 | 11/2007 | Johnson et al. | |
| 7,303,735 B2 | 12/2007 | Suchak et al. | |
| 7,314,558 B1 | 1/2008 | Jaroszczyk et al. | |
| 7,323,106 B2 | 1/2008 | Jaroszczyk et al. | |
| 7,326,266 B2 | 2/2008 | Barnwell | |
| 7,328,572 B2 | 2/2008 | McKinley et al. | |
| 7,354,563 B2 | 4/2008 | Smalley et al. | |
| 7,390,477 B2 | 6/2008 | Smalley et al. | |
| 7,390,767 B2 | 6/2008 | Smalley et al. | |
| 7,406,960 B2 | 8/2008 | Knauf et al. | |
| 7,413,588 B2 | 8/2008 | Holzmann et al. | |
| 7,416,657 B2 | 8/2008 | Kretchmar | |
| 7,419,601 B2 | 9/2008 | Cooper et al. | |
| 7,419,624 B1 | 9/2008 | Smalley et al. | |
| 7,419,651 B2 | 9/2008 | Smalley et al. | |
| 7,473,291 B2 | 1/2009 | Evenstad et al. | |
| 7,481,881 B2 | 1/2009 | Okahisa | |
| 7,481,989 B2 | 1/2009 | Smalley et al. | |
| 7,510,695 B2 | 3/2009 | Smalley et al. | |
| 7,527,739 B2 | 5/2009 | Jiang et al. | |
| 7,563,368 B2 | 7/2009 | Martin et al. | |
| 7,581,558 B2 | 9/2009 | Martin et al. | |
| 7,582,130 B2 | 9/2009 | Ng et al. | |
| 7,591,279 B2 | 9/2009 | Martin et al. | |
| 7,614,390 B2 | 11/2009 | Holzmann et al. | |
| 7,632,569 B2 | 12/2009 | Smalley et al. | |
| 7,648,543 B2 | 1/2010 | Faber et al. | |
| 7,648,565 B2 | 1/2010 | Clausen et al. | |
| 7,655,073 B2 | 2/2010 | Evenstad et al. | |
| 7,655,302 B2 | 2/2010 | Smalley et al. | |
| 7,662,216 B1 | 2/2010 | Terres et al. | |
| 7,674,425 B2 | 3/2010 | Schwandt et al. | |
| 7,678,169 B1 | 3/2010 | Gwin et al. | |
| 7,699,029 B2 | 4/2010 | Herman et al. | |
| 7,857,883 B2 | 12/2010 | Scheckel et al. | |
| 7,879,388 B2 | 2/2011 | Clarkson et al. | |
| 7,887,934 B2 | 2/2011 | Gentleman et al. | |
| 7,892,660 B2 | 2/2011 | Gentleman et al. | |
| 7,897,271 B2 | 3/2011 | Gentleman et al. | |
| 7,901,798 B2 | 3/2011 | Gentleman et al. | |
| 7,922,981 B2 | 4/2011 | Haptmann | |
| 7,939,136 B2 | 5/2011 | Smalley et al. | |

(56) References Cited

U.S. PATENT DOCUMENTS

| | | | |
|---|---|---|---|
| 7,939,325 B2 | 5/2011 | Adams, Jr. et al. | |
| 7,977,267 B2 | 7/2011 | Gentleman et al. | |
| 8,002,990 B2 | 8/2011 | Schroeder | |
| 2001/0045162 A1 | 11/2001 | McQuigg et al. | |
| 2002/0046970 A1* | 4/2002 | Murase et al. | 210/483 |
| 2002/0085968 A1 | 7/2002 | Smalley et al. | |
| 2002/0090330 A1 | 7/2002 | Smalley et al. | |
| 2002/0090331 A1 | 7/2002 | Smalley et al. | |
| 2002/0094311 A1 | 7/2002 | Smalley et al. | |
| 2002/0098135 A1 | 7/2002 | Smalley et al. | |
| 2002/0102196 A1 | 8/2002 | Smalley et al. | |
| 2002/0110682 A1 | 8/2002 | Brogan | |
| 2002/0115068 A1 | 8/2002 | Tomlinson et al. | |
| 2002/0119343 A1 | 8/2002 | Betts | |
| 2002/0127162 A1 | 9/2002 | Smalley et al. | |
| 2002/0127169 A1 | 9/2002 | Smalley et al. | |
| 2002/0136681 A1 | 9/2002 | Smalley et al. | |
| 2002/0136683 A1 | 9/2002 | Smalley et al. | |
| 2002/0150524 A1 | 10/2002 | Smalley et al. | |
| 2002/0159943 A1 | 10/2002 | Smalley et al. | |
| 2003/0010002 A1 | 1/2003 | Johnson et al. | |
| 2003/0045603 A1 | 3/2003 | Salovey et al. | |
| 2003/0080446 A1 | 5/2003 | Cheng | |
| 2003/0121858 A1 | 7/2003 | Yu et al. | |
| 2003/0158287 A1 | 8/2003 | Salovey et al. | |
| 2003/0194513 A1 | 10/2003 | Carlson | |
| 2004/0007255 A1 | 1/2004 | Labib et al. | |
| 2004/0060858 A1 | 4/2004 | Lucas et al. | |
| 2004/0094459 A1 | 5/2004 | Prater et al. | |
| 2004/0208841 A1 | 10/2004 | Salovey et al. | |
| 2004/0222156 A1 | 11/2004 | Yu et al. | |
| 2005/0026526 A1 | 2/2005 | Verdegan et al. | |
| 2005/0067724 A1 | 3/2005 | Cheng | |
| 2005/0084436 A1 | 4/2005 | Suchak et al. | |
| 2005/0221141 A1 | 10/2005 | Hampden-Smith et al. | |
| 2005/0233183 A1 | 10/2005 | Hampden-Smith et al. | |
| 2005/0233203 A1 | 10/2005 | Hampden-Smith et al. | |
| 2005/0247260 A1 | 11/2005 | Shin et al. | |
| 2005/0249656 A1 | 11/2005 | Smalley et al. | |
| 2005/0260120 A1 | 11/2005 | Smalley et al. | |
| 2005/0274257 A1 | 12/2005 | Reznik | |
| 2006/0108280 A1 | 5/2006 | Jodi | |
| 2006/0137317 A1 | 6/2006 | Bryner et al. | |
| 2006/0137318 A1 | 6/2006 | Lim et al. | |
| 2006/0153754 A1 | 7/2006 | Hauptmann | |
| 2006/0177572 A1 | 8/2006 | Smith et al. | |
| 2006/0192504 A1 | 8/2006 | Ardavan et al. | |
| 2006/0207234 A1 | 9/2006 | Ward et al. | |
| 2006/0213162 A1 | 9/2006 | Jodi | |
| 2006/0242933 A1 | 11/2006 | Webb et al. | |
| 2007/0028588 A1 | 2/2007 | Varanasi et al. | |
| 2007/0039865 A1 | 2/2007 | Jiang et al. | |
| 2007/0043158 A1 | 2/2007 | Smalley et al. | |
| 2007/0045001 A1 | 3/2007 | Dalzell et al. | |
| 2007/0048209 A1 | 3/2007 | Smalley et al. | |
| 2007/0062886 A1 | 3/2007 | Rego et al. | |
| 2007/0062887 A1 | 3/2007 | Schwandt et al. | |
| 2007/0084776 A1 | 4/2007 | Sasur | |
| 2007/0107399 A1 | 5/2007 | Schwandt et al. | |
| 2007/0131235 A1 | 6/2007 | Janikowski et al. | |
| 2007/0223019 A1 | 9/2007 | Maeyama | |
| 2007/0278004 A1 | 12/2007 | Dalzell et al. | |
| 2007/0289915 A1 | 12/2007 | Jiang et al. | |
| 2008/0050618 A1 | 2/2008 | Tanno et al. | |
| 2008/0053888 A1 | 3/2008 | Ellis et al. | |
| 2008/0063585 A1 | 3/2008 | Smalley et al. | |
| 2008/0063588 A1 | 3/2008 | Smalley et al. | |
| 2008/0070022 A1 | 3/2008 | Umezu et al. | |
| 2008/0089830 A1 | 4/2008 | Smalley et al. | |
| 2008/0107586 A1 | 5/2008 | Smalley et al. | |
| 2008/0133018 A1 | 6/2008 | Salovey et al. | |
| 2008/0163814 A1 | 7/2008 | Kim et al. | |
| 2008/0220148 A1 | 9/2008 | Clarkson et al. | |
| 2008/0224100 A1 | 9/2008 | Smalley et al. | |
| 2008/0264018 A1 | 10/2008 | Herman | |
| 2008/0292498 A1 | 11/2008 | Resch et al. | |
| 2008/0311025 A1 | 12/2008 | Smalley et al. | |
| 2009/0004094 A1 | 1/2009 | Smalley et al. | |
| 2009/0020465 A1 | 1/2009 | Jiang et al. | |
| 2009/0065419 A1 | 3/2009 | Jiang | |
| 2009/0100811 A1 | 4/2009 | Scheckel et al. | |
| 2009/0134097 A1 | 5/2009 | Kerfoot | |
| 2009/0142837 A1 | 6/2009 | Adams, Jr. et al. | |
| 2009/0146193 A1 | 6/2009 | Rudin | |
| 2009/0155566 A1 | 6/2009 | Gentleman et al. | |
| 2009/0155609 A1 | 6/2009 | Gentleman et al. | |
| 2009/0159512 A1 | 6/2009 | Brattested | |
| 2009/0169463 A1 | 7/2009 | Smalley et al. | |
| 2009/0188870 A1 | 7/2009 | Schroeder | |
| 2009/0191103 A1 | 7/2009 | Hauptmann | |
| 2009/0229632 A1 | 9/2009 | Labib et al. | |
| 2009/0250402 A1 | 10/2009 | Jiang et al. | |
| 2010/0006149 A1 | 1/2010 | Gentleman et al. | |
| 2010/0029465 A1 | 2/2010 | Gentleman et al. | |
| 2010/0101993 A1 | 4/2010 | Wells et al. | |
| 2010/0143620 A1 | 6/2010 | Ajdelsztajn et al. | |
| 2010/0147185 A1 | 6/2010 | Gentleman et al. | |
| 2010/0151197 A1 | 6/2010 | Gentleman et al. | |
| 2010/0151264 A1 | 6/2010 | Gentleman et al. | |
| 2010/0213436 A1 | 8/2010 | Khan | |
| 2010/0219117 A1 | 9/2010 | Reiland et al. | |
| 2010/0252510 A1 | 10/2010 | Godsay et al. | |
| 2010/0264401 A1 | 10/2010 | Adivarahan et al. | |
| 2010/0320124 A1 | 12/2010 | Zhang et al. | |
| 2010/0320440 A1 | 12/2010 | Khan | |
| 2011/0052902 A1 | 3/2011 | Gentleman et al. | |
| 2011/0073838 A1 | 3/2011 | Khan et al. | |
| 2011/0083583 A1 | 4/2011 | Gentleman et al. | |
| 2011/0083736 A1 | 4/2011 | Gentleman et al. | |
| 2011/0086200 A1 | 4/2011 | Gentleman et al. | |
| 2011/0086754 A1 | 4/2011 | Gentleman et al. | |
| 2011/0086781 A1 | 4/2011 | Smalley et al. | |
| 2011/0109712 A1 | 5/2011 | Grant et al. | |
| 2011/0115102 A1 | 5/2011 | Dema | |
| 2011/0212525 A1 | 9/2011 | Adams, Jr. et al. | |

OTHER PUBLICATIONS

International Search Report for PCT/US2010/034922 dated Jan. 10, 2012.
Written Opinion for PCT/US2010/034922 dated Jan. 10, 2012.
Final Office Action received for U.S. Appl. No. 12/247,502 dated Aug. 18, 2011.
Final Office Action received for U.S. Appl. No. 12/247,502 dated Aug. 24, 2012.
Final Office Action received for U.S. Appl. No. 12/820,784 dated Apr. 29, 2013.
Final Office Action received for U.S. Appl. No. 12/820,791 dated Feb. 21, 2013.
First Office Action received for Chinese Appln. No. 201080021992.6 dated Nov. 1, 2013.
International Search Report and Written Opinion for PCT/US2011/031257 dated May 28, 2011.
Non-final Office Action received for U.S. Appl. No. 12/247,502 dated Mar. 24, 2011.
Non-final Office Action received for U.S. Appl. No. 12/247,502 dated May 3, 2012.
Non-final Office Action received for U.S. Appl. No. 12/820,784 dated Nov. 26, 2012.
Non-final Office Action received for U.S. Appl. No. 12/820,791 dated Aug. 23, 2012.
Non-final Office Action received for U.S. Appl. No. 13/875,589 dated Oct. 7, 2013.
Notice of Allowance received for U.S. Appl. No. 12/247,502 dated Nov. 23, 2012.
Notice of Allowance received for U.S. Appl. No. 12/820,784 dated May 5, 2013.
Notice of Allowance received for U.S. Appl. No. 12/820,791 dated Aug. 19, 2013.

(56) References Cited

OTHER PUBLICATIONS

Notice of Allowance received for U.S. Appl. No. 13/875,859 dated Nov. 13, 2013.
First Office Action for Chinese Patent Application No. 2011800303530 with English Translation, dated Apr. 18, 2014, 69 pages.
First Office Action for Chinese Patent Application No. 2011800315928 with English Translation, dated May 7, 2014, 7 pages.
Second Office Action for Chinese Patent Application No. 2009801395617 with English Translation, dated Jan. 30, 2014, 5 pages.
Second Office Action for Chinese Patent Application No. 201080021992.6 with English translation, dated May 5, 2014, 6 pages.
Office Action issued in Chinese Patent No. 201180031592.8, dated Dec. 25, 2014.
Decision on Grant A Patent for Invention issued in Russian Application No. 2013102593/05, dated Feb. 18, 2015.

* cited by examiner

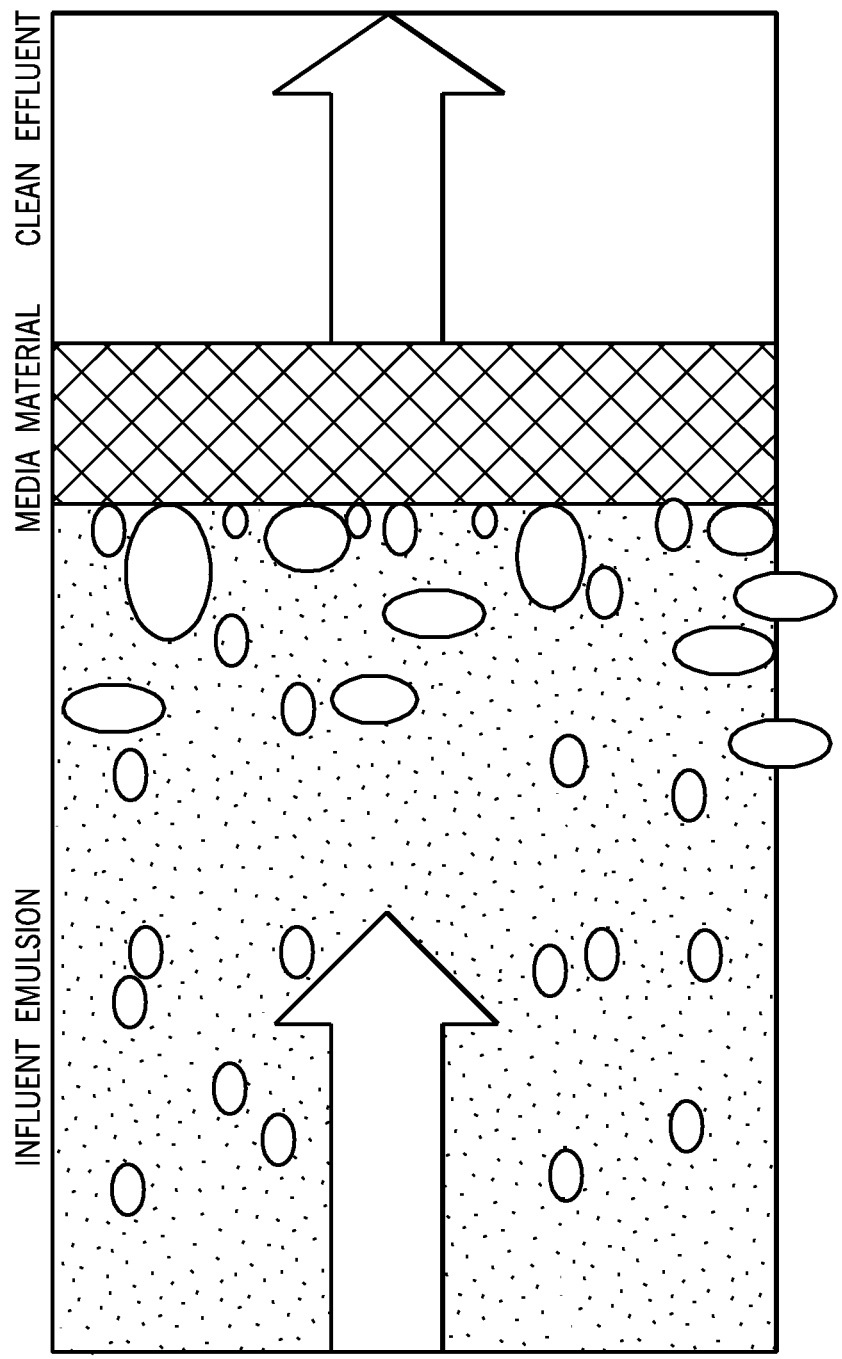

SURFACE COALESCERS

CROSS-REFERENCE TO RELATED APPLICATIONS

The present application claims the benefit under 35 U.S.C. §119(e) to U.S. Provisional Application Nos. 61/179,939, filed on May 20, 2009; 61/179,170, filed on May 18, 2009; and 61/178,738; filed on May 15, 2009, the contents of which are incorporated herein by reference in their entireties.

BACKGROUND

The field of the invention relates to coalescers, coalescing elements, coalescing systems, coalescing methods, and coalescing media for coalescing a mixture of two phases, namely a continuous phase and a dispersed phase. In particular, the field relates to coalescers, coalescing elements, coalescing systems, coalescing methods, and coalescing media for coalescing drops of the dispersed phase in order to collect and remove the dispersed phase from the mixture.

Coalescers are used widely to remove immiscible droplets from a gaseous or liquid continuous phase, such as in crankcase ventilation (CV) filtration, fuel water separation (FWS), and oil-water separation. Prior art coalescer designs incorporate the principles of enhanced droplet capture and coalescence by utilizing graded capture (i.e., decreasing fiber diameter, pore size and/or porosity in coalescing media) or by utilizing thick depth coalescers. Wettability also is recognized as affecting coalescer performance. (See, e.g., U.S. Pat. No. 6,767,459 and U.S. published Patent Application Nos. 2007-0131235 and 2007-0062887). U.S. Pat. No. 5,443,724 discloses that the media should have a surface energy greater than water in order to improve coalescer performance (i.e., that the media should be preferentially wetted by both coalescing droplets and continuous phases). U.S. Pat. No. 4,081,373 discloses that coalescing media should be hydrophobic in order to remove water from fuel. U.S. published Patent Application No. 2006-0242933 discloses an oil-mist coalescer in which the filtration media is oleophobic, thereby enabling the fluid mist to coalesce into droplets and drain from the filtration media.

With regard to the removal of water from fuel, there is a need to increase removal efficiency and to remove smaller droplets than in the past, in order to protect high pressure rail fuel-injection systems. This challenge is further magnified by the introduction of new fuels with lower interfacial tensions and different additive packages, than fuels in the past. In fuels with lower interfacial tension, the size of dispersed drops is decreased, making the drops more difficult to remove. Enhanced coalescence therefore is needed to meet these challenges. Improved coalescers that include improved coalescing media also are desirable because they permit the use of a smaller media pack in view of improved coalescing efficiency. In fuels with lower interfacial tension, the size of drops is decreased, making the drops more difficult to remove.

In the case of fuel, high pressure common rail (HPCR) application, essentially all non-dissolved water should be removed from ultra low sulfur diesel (ULSD) fuel and biodiesel. These fuels tend to have lower interfacial tensions, therefore smaller drop size and more stable emulsions, than previous diesel fuel. In addition, the rate of coalescence between drops may be reduced by the presence of surfactants. Traditional FWS tend to be single-stage devices in which the media is phobic with respect to the dispersed phase and acts as a barrier to the dispersed phase. Traditional FWS tend not to provide adequate removal for HPCR systems, as they are intended for use upstream of a fuel pump with high interfacial tension fuels, hence, their pore size tends to be too large to effectively capture the small drops. Also, even when the mean pore size is sufficiently small, FWS media typically possess a maximum pore size great enough that excessive amounts of water passes through these large pores. Traditional two-stage fuel-water coalescers (FWC) are designed to be used downstream of the fuel pump and tend to be two-stage devices for fuel in which the first stage captures the drops, holds them so coalescence can occur, then releases the enlarged drops which are removed by sedimentation/settling, typically after being blocked by the second separator stage (where the second separator stage acts as an FWS). Traditional two-stage FWC tend to provide higher removal efficiency than FWS, but tend to have insufficient life, due to plugging by solids or semisolids. To varying degrees, both FWS and FWC are adversely affected by the presence of surfactants that lower interfacial tension, reduce drop size, slow down the rate of coalescence, stabilize emulsions, and may adsorb onto media and render it less effective. Therefore, is a need for a high efficiency, low pressure drop fuel water coalescer that is minimally affected by low interfacial tension and the presence of surfactants.

For CV applications, near 100% removal efficiency of oil mist is required to protect the turbocharger in closed CV applications and to protect the environment in open CV applications. Increasingly high efficiency, low pressure drop and longer life are sought. To accomplish this, the media should be protected from plugging, submicron droplets need to be removed, and the oil needs to drain quickly from the media.

SUMMARY

Disclosed are coalescer media, coalescers, coalescing elements, coalescing systems, and coalescing methods for coalescing a mixture of two immiscible phases, namely a continuous phase and a dispersed phase. The disclosed coalescers, elements, systems, and methods may be utilized in order to remove or collect the dispersed phase from the mixture and may comprise or consist of a single layer or multiple layers of media material.

The disclosed coalescer media, coalescers, elements, systems, and methods are configured for capturing droplets of a dispersed phase from a mixture of the dispersed phase and a continuous phase. In the coalescers, systems, and methods, the mixture is passed from upstream to downstream through one or more layers of coalescing media. As the mixture is passed through the media, droplets of the dispersed phase coalesce and grow on the upstream surface of the media to a sufficient size whereby they are released, drained, or collected. The coalescing media may include a single layer of media material that is relatively non-wettable by the dispersed phase in the continuous phase, and optionally includes additional layers of media material.

The disclosed coalescers, elements, systems, and methods may be utilized to coalesce any suitable mixture that includes a continuous phase and a dispersed phase. Typically, the continuous phase and the dispersed phase are immiscible liquids. For example, the disclosed systems and methods may be configured or utilized for coalescing water dispersed in a hydrocarbon liquid (e.g., hydrocarbon fuel, diesel fuel, biodiesel fuel, lubricating oil, hydraulic oil, or transmission oil). In other embodiments, the continuous phase is water and the dispersed phase is hydrocarbon liquid. In further embodiments, the continuous phase is a gas and the dispersed phase is a liquid.

The coalescing media may include a single layer of media material that is relatively non-wettable by the dispersed phase in the continuous phase in order to facilitate coalescence of the dispersed phase at the upstream face of the media material. Preferably, the upstream surface (or face) of the media material is relatively smooth (e.g., by subjecting the surface to calendaring) to facilitate draining of coalesced drops of the dispersed phase.

The single layer has a mean pore size M, which may be determined by porometer. Typically, the mean pore size for the single layer is less than the average droplet size for the dispersed phase of the mixture. The mean pore size of the single layer may have a preferred size. In some embodiments, 0.2 µM≤M≤12.0 µM (preferably 2.0 µM≤M≤10.0 µM, or more preferably 4.0 µM≤M≤8.0 µM). The single layer further may have a maximum pore size $M_M$. Preferably, the single layer has a maximum pore size $M_M$ and $1 \leq M_M/M \leq 3$, or more preferably, $1 \leq M_M/M \leq 2$.

The single layer of media material has a capillary pressure P. Capillary pressure for the layer may be defined as:

$$P = \frac{4\gamma \cos\theta}{M}$$

where P=local capillary pressure for the layer;
  γ=interfacial tension;
  θ=contact angle of a drop of the dispersed phase in the continuous phase on the layer; and
  M=pore size for the layer.

The single layer of media material is relatively non-wettable by the dispersed phase in the continuous phase. In some embodiments, the contact angle for a drop of dispersed phase in the continuous phase on the media material, θ, is no less than 90°, and preferably no less than 120° (more preferably no less than 135°).

The single layer of media material has a porosity ε. Preferably, the porosity ε is no less than 0.8. In some embodiments, the single layer of media material includes a layer of relatively fine fibers having a mean diameter between 0.07 µm and 3.0 µm (preferably between 0.15 µm and 1.5 µm) supported on a substrate of relatively coarser fibers with a mean diameter greater than the mean diameter of the relatively fine fibers (e.g., where the relatively coarser fibers have a mean diameter greater than about 10 µm, preferably greater than about 20 µm). In other embodiments, the single layer includes a heterogenous mixture comprising relative fine fibers having a diameter between 0.07 µm and 3.0 µm (preferably between 0.15 µm and 1.5 µm) and relatively coarser fibers with diameter greater than the mean diameter of the relatively fine fibers (e.g., where the relatively coarser fibers have a mean diameter greater than about 10 µm, preferably greater than about 20 µm).

The single layer preferably has a thickness suitable for coalescing a dispersed phase in a continuous phase. In some embodiments, the single layer has a thickness as measured from upstream to downstream relative to flow through the layer of between about 0.05 and 0.4 mm (preferably 0.1 and 0.3 mm).

In further embodiments, the disclosed coalescing media includes at least two adjacent layers that extend in series from upstream to downstream, namely at least a first layer and at least a second layer, where the second layer may have the characteristics of the single layer as described above. The first layer has a mean pore size $M_1$ that is greater than the mean pore size of the second layer $M_2$, for example as determined by porometer. In some preferred embodiments, $M_1$ is at least about 2.5 times greater than $M_2$ (preferably at least about 5 times greater than $M_2$, or more preferably at least about 10 times greater than $M_2$, even more preferably at least about 20 times greater than $M_2$). The mean pore sizes of the first layer and the second layer may have a preferred size. In some embodiments, $M_1$ may be no less than about 30 µm (preferably no less than about 180 µm). In other embodiments, 0.2 µM≤$M_2$≤12.0 µM (preferably 2.0 µM≤$M_2$≤10.0 µM, or more preferably 4.0 µM≤$M_2$≤8.0 µM).

The first layer and the second layer further may have maximum pore sizes $M_{M1}$ and $M_{M2}$, respectively. Preferably, the second layer has a maximum pore size $M_{M2}$ and $1 \leq M_{M2}/M_2 \leq 3$. More preferably, $1 \leq M_{M2}/M_2 \leq 2$.

In the disclosed coalescing media, the first layer and the second layer have capillary pressures, $P_1$ and $P_2$, respectively. Capillary pressure for a layer may be defined as:

$$P_l = \frac{4\gamma \cos\theta_l}{M_l}$$

where P=local capillary pressure for the indicated layer l;
  γ=interfacial tension;
  θ=contact angle of a drop of the dispersed phase in the continuous phase on the layer; and
  M=pore size for the indicated layer l.

In some embodiments of the coalescing media disclosed herein $P_1 \geq P_2$.

In the disclosed coalescing media, the first layer includes media material that is relatively wettable by the dispersed phase in the continuous phase in comparison to the second layer, and in contrast, the second layer includes media material that is relatively non-wettable by the dispersed phase in the continuous phase in comparison to the first layer. In some embodiments, the contact angle for a drop of dispersed phase in the continuous phase on layer one, $\theta_1$, is no more than 90°, and preferably no more than 45°. In further embodiments, the contact angle for a drop of dispersed phase in the continuous phase on layer two, $\theta_2$, is no less than 90°, and preferably no less than 120° (more preferably no less than 135°).

In the disclosed coalescing media, the first layer and the second layer comprise filter media having porosities $\epsilon_1$ and $\epsilon_2$, respectively. Preferably, the second layer comprises filter media (optionally fibrous filter media) having a porosity $\epsilon_2$ that is no less than 0.8. In some embodiments, the second layer of media material includes a layer of relatively fine fibers having a mean diameter between 0.07 µm and 3.0 µm (preferably between 0.15 µm and 1.5 µm) supported on a substrate of relatively coarser fibers with a mean diameter greater than the mean diameter of the relatively fine fibers (e.g., where the relatively coarser fibers have a mean diameter greater than about 10 µm, preferably greater than about 20 µm). In other embodiments, the second layer includes a heterogenous mixture comprising relative fine fibers having a diameter between 0.07 µm and 3.0 µm (preferably between 0.15 µm and 1.5 µm) and relatively coarser fibers with diameter greater than the mean diameter of the relatively fine fibers (e.g., where the relatively coarser fibers have a mean diameter greater than about 10 µm, preferably greater than about 20 µm).

The second layer preferably has a thickness suitable for coalescing a dispersed phase in a continuous phase. In some embodiments the second layer has a thickness as measured from upstream to downstream relative to flow through the layer of between about 0.05 and 0.4 mm (preferably 0.1 and 0.3 mm).

The adjacent surfaces of the first layer and the second layer (i.e., the downstream surface of the first layer and the upstream face of the second layer) may be configured to facilitate draining of coalesced drops of the dispersed phase. For example, in one embodiment of the coalescing media disclosed herein the downstream surface of the first layer may comprise fibers that are oriented in a substantially vertical direction and/or the upstream surface of the second layer may be relatively smooth (e.g., by subjecting the surface to calendaring) in order to facilitate draining of coalesced drops of the dispersed phase.

The components of the disclosed coalescers, elements, systems, and methods may be arranged in any suitable configuration. In some embodiments, the components may extend in series from upstream to downstream in an axial direction (e.g., where the components are configured as a linear coalescing element), or in other embodiments the components may extend in series from upstream to downstream in a radial direction (e.g., where the components are configured as a cylindrical coalescer element utilizing either an inside-out or an outside-in flow configuration). The coalescing media also may be configured in a flat-panel or other arrangement.

The disclosed coalescers, elements, systems, and methods, optionally may include or utilize a housing. The housing may include an upstream inlet structured to receive the mixture, a first downstream outlet structured to discharge the cleaned mixture (with reduced dispersed phase concentration) after coalescing, and optionally a second outlet structure to discharge the coalesced dispersed phase. Preferably, the second outlet is on the upstream side of the media material, but downstream of the upstream inlet.

The disclosed coalescer media, coalescers, coalescing elements, coalescing systems, and coalescing methods typically include or utilize a single layer of media material (or optionally multiple layers of media material) for coalescing a dispersed phase from a mixture of the dispersed phase in a continuous phase. Optionally, the coalescers, coalescing elements, coalescing systems, and coalescing methods may include or utilize additional media (e.g., additional media positioned downstream of the coalescing media material). In some embodiments, the disclosed coalescers, coalescing elements, coalescing, and coalescing methods further may include or further may utilize an additional hydrophobic media material for removing water, where the additional hydrophobic media material is positioned downstream of the single layer of media material (or optional multiple layers of media material). In some embodiments, the disclosed coalescer media, coalescers, coalescing elements, coalescing systems, and coalescing methods further may include or further may utilize an additional media sublayer downstream of the coalescing layer to provide structural support.

In some embodiments, the disclosed coalescers, elements, systems, or methods may be utilized for removing water dispersed in a hydrophobic liquid, including, but not limited to, hydrocarbon fuel, diesel fuel, biodiesel fuel, lubricating oil, hydraulic oil, or transmission oil. Preferably, the coalescers, systems, or methods remove at least about 93% of water dispersed in liquid hydrocarbon fuel (more preferably at least about 95% of water dispersed in liquid hydrocarbon fuel, even more preferably at least about 97% of water dispersed in liquid hydrocarbon fuel, most preferably at least about 99% of water dispersed in liquid hydrocarbon fuel) after the liquid hydrocarbon fuel is passed through the coalescers, systems, or subjected to the methods. In other embodiments, the coalescers, coalescing elements, coalescing systems, and coalescing methods may be utilized for removing hydrocarbon liquid dispersed in water.

BRIEF DESCRIPTION OF THE DRAWINGS

FIG. 1 provides a conceptual illustration of a surface coalescence process as contemplated herein.

DETAILED DESCRIPTION

Figure 2A:
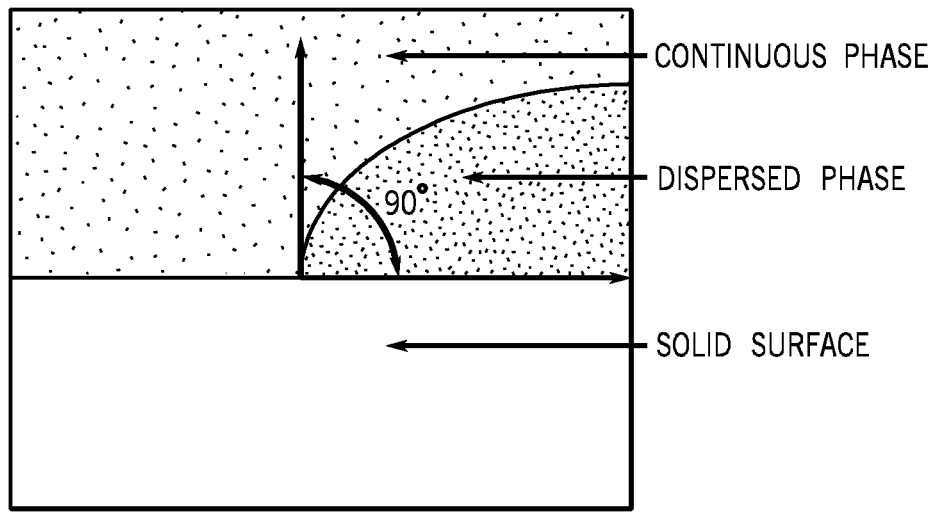
FIG. 2 illustrates a method for determining contact angle $\theta$ for a dispersed drop on a media phase.

Disclosed are coalescers, systems and methods for coalescing a mixture of two phases, namely a continuous phase and a dispersed phase. The disclosed coalescers, systems and methods may be utilized to collect and remove the dispersed phase from the mixture.

The disclosed coalescers, systems and methods include or utilize coalescing media that comprises, or alternatively consists of, a single layer of media material. As contemplated herein, the layer may have a desirable pore size, capillary pressure, porosity, and solidity. The terms "pore size," "capillary pressure," "porosity," "fiber diameter," and "solidity," may refer to "average" or "mean" values for these terms (e.g., where the layer is non-homogenous or graded and "pore size," "capillary pressure," "porosity," "fiber diameter," and "solidity," are reported as mean pore size, average capillary pressure, average porosity, average fiber diameter, or average solidity for the non-homogenous or graded layer).

The disclosed coalescers, systems and methods may be utilized to coalesce a dispersed phase from a mixture of the dispersed phase in a continuous phase. Mixtures contemplated herein may include mixtures of a hydrophobic liquid (e.g., a hydrocarbon liquid) and an aqueous liquid (e.g., water). In some embodiments, the continuous phase may be a hydrocarbon liquid and the dispersed phase may be water. In other embodiments, the continuous phase may be water and the dispersed phase may be a hydrocarbon liquid. As contemplated herein, a hydrocarbon liquid primarily includes hydrocarbon material but further may include non-hydrocarbon material (e.g., up to about 1%, 5%, 10%, or 20% non-hydrocarbon material).

The disclosed coalescers, systems, and methods may be particularly suitable for coalescing a dispersed phase from an emulsion mixture having an interfacial tension lower than about 20 dyne/cm (or lower than about 15, 10, or 5 dyne/cm). For example, the coalescers, systems, and methods may be utilized to coalesce water from hydrocarbon liquids comprising surfactants and having an interfacial tension lower than about 20 dyne/cm (or lower than about 15, 10, or 5 dyne/cm).

The coalescing media material utilized in the disclosed coalescers, systems, and methods typically is relatively non-wettable by the dispersed phase in the continuous phase in order to facilitate coalescence of the dispersed phase at the upstream face of the media material. Preferably, the media material remains relatively non-wettable by the dispersed phase in the continuous phase over long periods of exposure to the mixture, in particular, where the mixture comprises a surfactant. The coalescing media, as described herein, may comprise a layer of fibrous material (e.g., polymer, glass, ceramic, or metal fibers). In some embodiments, the coalescing media may comprise a layer of a polyester material (e.g., polybutylene terephthalate (PBT)), a polyamide material, a halocarbon material (e.g., Halar® brand ethylene chlorotrifluoroethylene (ECTFE)), or a media obtained by treating a fibrous material with an agent comprising fluorine functionalities. In some embodiments, the media may comprise PBT with 1-10% (w/w) of a fluorocarbon additive (e.g., hexafluoropropylene, hexafluoroisopropanol, hexafluoroisobutylene, and perfluorodecylacrylate), a polyester material (e.g., PBT) compounded with 10-40% (w/w) of a fluorocarbon polymer (e.g., ECTFE), or 100% meltblown/fiber grade fluoropolymer (e.g., ECTFE).

The coalescing media material utilized in the disclosed coalescers, systems, and methods has a desirable mean pore size, fiber diameter, contact angle, and porosity in order to achieve the desired coalescence. The media material may be homogenous or heterogenous. The "fiber diameter," "contact angle," and "porosity" for the media material may refer to "average fiber diameter," "average contact angle," and "average porosity" for the media material.

The disclosed coalescers, systems, and methods typically include or utilize a single layer of media material. In some embodiments, the disclosed coalescers, systems, and methods include or utilize a separate separator or stripping stage that is placed downstream and separated from the single layer of media material (e.g., hydrophobic material for removing water located downstream and separate from the single layer of media material).

The coalescing media described herein may comprise material having distinct hydrophilicity or hydrophobicity, or distinct oleophilicity or oleophobicity. In some embodiments, the coalescing media comprises a single layer comprising relatively hydrophobic material, relative to the dispersed phase of the mixture.

The coalescers, systems, and methods contemplated herein may include or utilize components referred to as "coalescing elements," "coalescing filters," "coalescing apparatuses," "coalescing assemblies," and "housings" therefor as known in the art. (See, e.g., U.S. Pat. Nos. 7,416,657; 7,326,266; 7,297,279; 7,235,177; 7,198,718; 6,907,997; 6,811,693; 6,740,358; 6,730,236; 6,605,224; 6,517,615; 6,422,396; 6,419,721; 6,332,987; 6,302,932; 6,149,408; 6,083,380; 6,056,128; 5,874,008; 5,861,087; 5,800,597; 5,762,810; 5,750,024; 5,656,173; 5,643,431; 5,616,244; 5,575,896; 5,565,078; 5,500,132; 5,480,547; 5,480,547; 5,468,385; 5,454,945; 5,454,937; 5,439,588; 5,417,848; 5,401,404; 5,242,604; 5,174,907; 5,156,745; 5,112,498; 5,080,802; 5,068,035; 5,037,454; 5,006,260; 4,888,117; 4,790,947; 4,759,782; 4,643,834; 4,640,781; 4,304,671; 4,251,369; 4,213,863; 4,199,447; 4,083,778; 4,078,965; 4,052,316; 4,039,441; 3,960,719; 3,951,814; and U.S. published Application Nos. 2007-0289915; 2007-0107399; 2007-0062887; 2007-0062886; and 2007-0039865; the contents of which are incorporated herein by reference in their entireties.) The coalescing media disclosed herein may be manufactured utilizing methods known in the art and may include additional features disclosed in the art. (See, e.g., U.S. Pat. Nos. 6,767,459; 5,443,724; and 4,081,373; and U.S published Patent Application Nos. 2007-0131.235; 2007-0062887; and 2006-0242933; the contents of which are incorporated herein by reference in their entireties).

The coalescence process as disclosed herein may be understood to comprise a series of steps including, but not limited to: (1) capture of droplets by the coalescence media material; (2) coalescence and drop growth at the upstream face of the media material; (3) drainage of coalesced drops at the upstream face of the media material; and (4) release of coalesced drops from the media material. When the coalesced drops become large enough, drag or gravitational forces induce them to flow down the upstream face of the media material until they are released. The increased droplet concentration at the upstream face of the coalescence media material and the relatively non-wetting nature of the media material facilitates the coalescence of droplets at the upstream surface of the media material. The drainage of coalesced drops from the media material may be facilitated by utilizing a media material having an upstream face with a relatively smooth surface This invention can be applied to any set of immiscible fluids, such as water in diesel fuel, water in biodiesel fuel, oil in water, and crankcase oil from engine blow-by gases. In further embodiments, the coalescing media is present in a coalescing system that further includes a device for removing drops that are coalesced by the coalescing media. For example, a coalescing system further may include one or more of a gravity separator, centrifuge, impactor, lamella separator, inclined stacked plate, screen, quiescent chamber, and the like.

The coalescers, systems, and methods disclosed herein may include or utilize a single layer of media material, or optionally multiple layers of media material, in which coalescence mechanisms having been optimized (i.e., coalescers, systems, and methods in which the physical, structural, and surface properties of the media material have been optimized). The following discussion provides exemplary rules and optimal relationships among the variables P, θ, M, d, and ϵ for a layer of media material. However, the preferred values selected ultimately may depend upon the concentration and size distribution of solids and semi-solids in the fluid to be coalesced, as these properties influence the life of the coalescer; and the upstream droplet size distribution, and the anticipated γ, interfacial tension for application, directly impact the design of the layer. These disclosed principles may be utilized to design a coalescer, system, or method that exhibits superior performance.

The disclosed principles may be utilized to design coalescers, systems, and methods for removing a dispersed phase (e.g., water) from a continuous phase (e.g., hydrocarbon fuel). For example, the disclosed coalescers, systems, and methods may be utilized for removing a dispersed phase from a continuous phase where at least about 93, 95, 97, or 99% of the dispersed phase is removed from the continuous phase after the phases are passed through the coalescers, systems, or are subjected to the methods disclosed herein.

One embodiment of a surface coalescer system is illustrated in FIG. 1, which performs as follows:

1. Contaminated fluid consisting of droplets (dispersed phase) suspended in a second immiscible fluid (continuous phase), which may or may not also contain solid particulates flow through the system and contact a layer of media material.
2. Droplets and solid particulates are retained on or near the upstream surface of the media material, which acts as a barrier that prevents them from flowing through and concentrates the droplets.
3. Filtered, cleaned continuous phase exits the layer of media material.

4. As the local concentration of captured droplets on the upstream face of the media material increases, they coalesce and grow which is facilitated by the relatively non-wetting character of the media material.
5. Coalesced drops from the surface of the media material are repelled by the relatively non-wetting surface and drain down the face of the non-wetting upstream face of the media material.
6. Drainage of the coalesced and wicked dispersed phase also rinse some of the capture solid particulates from the media.

The media material may be described as having at least three basic functions:
1. to prevent droplets (and solid particles) larger than a certain size from passing through,
2. to facilitate coalescence by concentrating the retained droplets on its upstream surface, and
3. to facilitate release of drops and droplets from the surface.

Preferably, in order to facilitate release, whether by gravity settling, drag forces, or other means, and to prevent drops from penetrating the media, the media material is highly non-wetting with respect to the dispersed phase of the mixture. Also, preferably, the capillary pressure for the dispersed phase in the media material is negative and should be greater in magnitude than the pressure drop across the media material. Further, dispersed drops preferably should not penetrate nor pass through the media material.

Figure 2B:
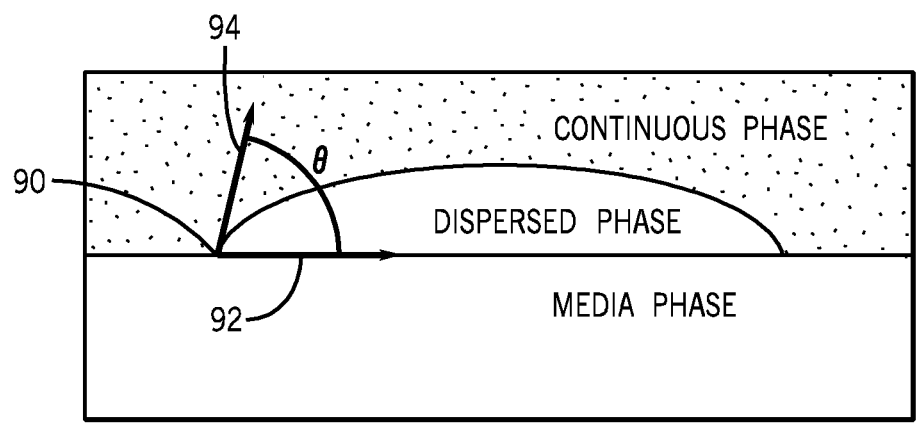

Capillary pressure may be defined as:

$$P = \frac{4\gamma\cos\theta}{M} \quad (1)$$

where P=local capillary pressure
γ=interfacial tension
θ=contact angle of a drop on the media in the fluid
M=pore size The contact angle θ may be defined as in FIG. 2 where θ is defined as an angle having its vertex 90 at the intersection of the continuous phase, dispersed phase, and media phase with one ray 92 extending parallel to the media surface from the vertex and the other ray 94 extending tangentially to the surface of the dispersed phase at the vertex. Typically, the angle θ is reported as being measured through the dispersed phase. In some embodiments, the contact angle may be measured for a droplet on an individual fiber of media material. In other embodiments, the contact angle may be measured for a droplet on a patch of media material. Other methods of estimating and measuring θ are known in the art.

The relationship between the pressure drop across the media, ΔP, and the critical capillary pressure, $P_C$, which is the minimum capillary pressure for the media material required to prevent passage of droplets larger than a certain size is given by:

$$-P_C \geq \Delta P \quad (2)$$

The critical capillary pressure $P_C$, can be found using equation (1) and inserting the following values: γ=lowest interfacial tension for which the coalescer is designed to operate; M=maximum pore size for the media (which should be smaller than the smallest drop size to be removed); and θ =contact angle of the media for the system. With respect to some embodiments of the coalescing media disclosed herein, θ and M may be important design properties, while γ is an application property typically outside the control of the filter manufacturer, but is accounted for in filter design.

In the media material, droplet capture typically occurs via one or more filtration mechanisms, such as diffusion, interception, inertial impaction, or sieving. For high efficiency removal of drop sizes approaching 1 μm or smaller, diffusion or sieving may be most effective. Since it is desirable for coalescence to occur on the surface of the media, as opposed to within the depth of the media as in traditional coalescers, the media of this invention is optimized to enhance removal by sieving. For the presently disclosed coalescing media, the pore size of the media material, M, typically is smaller than the smallest drop size that is desired to be removed.

Figure 3:
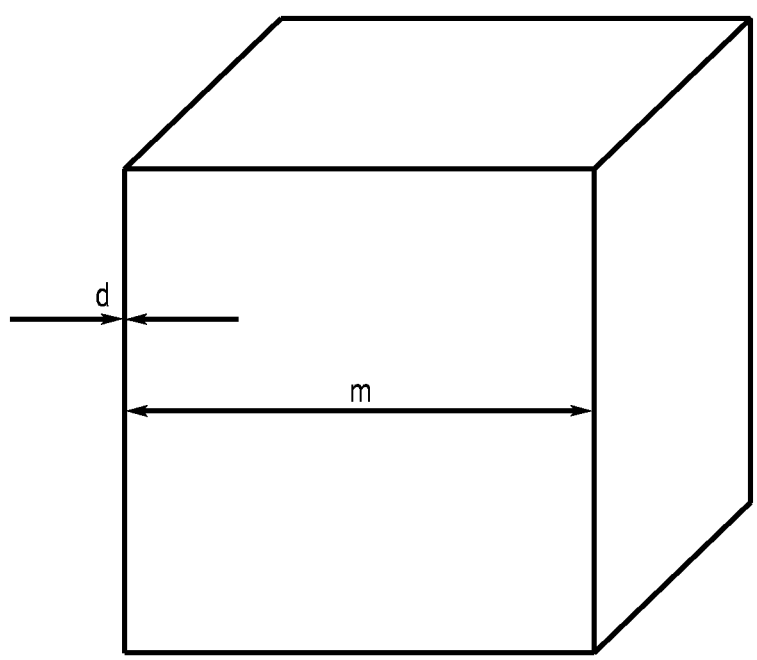
FIG. 3 provides a unit cube as a model for determining M as a function of d (fiber diameter) and $\epsilon$ as further discussed herein.

As an approximation, the media material may be modeled as a hypothetical unit cube as shown in FIG. 3, in order to determine optimal physical characteristics. FIG. 3 presents a 3-dimensional representation of a screen or sieve. Operationally, M can be defined as the equivalent sizes of pores, such as determined by a porometer. In the model, the face of a unit cell is a square with the open area equivalent to the circular cross-section assumed by the porometer. A length of a side of this square, m, is:

$$\frac{\pi M^2}{4} = m^2 \quad (3)$$

$$m = \frac{M\sqrt{\pi}}{2} \quad (4)$$

The total volume of the unit cube, $V_T$, is $$V_T = (m+d)^3 \quad (5)$$

where d=fiber diameter of the media.
The volume of the fibers in this unit cube, $V_f$, is:

$$V_f = \frac{3\pi(m+d)d^2}{4} \quad (6)$$

and the ε estimated from knowledge of M and d:

$$\varepsilon = 1 - \frac{V_f}{V_T} \quad (7)$$

$$\varepsilon = 1 - \frac{V_f}{V_T}$$

$$m = \frac{M\sqrt{\pi}}{2}$$

$$V_T = (m+d)^3$$

$$V_f = \frac{3\pi(m+d)d^2}{4}$$

$$\varepsilon = 1 - \frac{3\pi\left(\frac{M\sqrt{\pi}}{2}+d\right)d^2}{\left(\frac{M\sqrt{\pi}}{2}+d\right)^3}$$

$$R = \frac{M}{2}$$

$$\varepsilon = 1 - \frac{3\pi d^2}{4(R\sqrt{\pi}+d)^2}$$

$$\frac{3\pi d^2}{4(1-\varepsilon)} = (R\sqrt{\pi}+d)^2 = R^2\pi + 2Rd\sqrt{\pi} + d^2$$

$$0 = R^2\pi + 2Rd\sqrt{\pi} + d^2 - \frac{3\pi d^2}{4(1-\varepsilon)} \quad (8)$$

For a given M (M=2R), equation (8) shows the approximate relationship between d and ϵ needed to yield the desired pore size and drop size to be removed by sieving.

Figure 4:
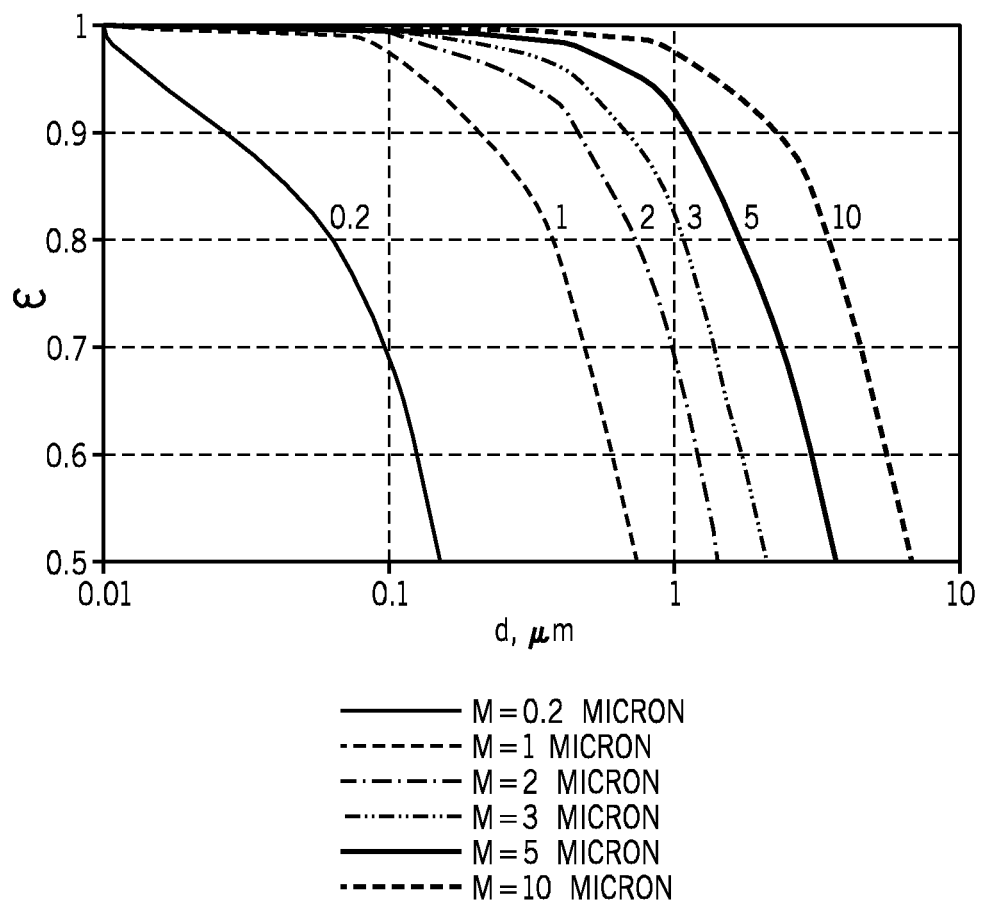
FIG. 4 illustrates the relationship between porosity and fiber diameter for different pore sizes.

Using the previously developed equations, the characteristics of the media material may be determined. For optimal design for a given application, the equations and model can be used for the specific conditions of drop size, γ and ΔP. In FIG. 4, results from equation (8) for different drop sizes (i.e., different values of M), are used to show the relationship between ϵ and d. For fuel water removal in high pressure common rail systems, the system is designed to remove drops smaller than ~3 μm. Drops smaller than ~0.2 μm can, in some embodiments, be considered to be dissolved or reverse micelles. For fibrous media material, it may be desirable that the media possess ϵ>0.8. Thus, in some embodiments 0.07 μm≤d≤3.0 μm, and, preferably, 0.15 μm≤d≤1.5 μm. In other embodiments, the media material may comprise a thin layer of fibers with diameter between 0.07 μm and 3.0 μm with ϵ sufficient to yield a pore size between 0.2 and 12 μm (preferably between 2.0 and 10 μm and more preferably between 4.0 and 8.0 μm), supported on a substrate of coarser fibers having a mean diameter greater than the mean diameter of the fine fibers (e.g., where the relatively coarser fibers have a mean diameter greater than about 10 μm, preferably greater than about 20 μm). In further embodiments, the media material may comprise a heterogenoumixture comprised of fine fibers with a mean diameter between 0.07 μm and 3.0 μm with ϵ sufficient to yield a mean pore size between 0.2 and 12 μm (preferably between 2.0 and 10 μm and more preferably between 4.0 and 8.0 μm) and coarser fibers having a mean diameter greater than the mean diameter of the fine fibers (e.g., where the relatively coarser fibers have a mean diameter greater than about 10 μm, preferably greater than about 20 μm).

In some embodiments, in order to achieve high efficiency, low pressure drop, or increased life, it may be desirable to use fibrous, non-woven media material, as opposed to membrane or granular material. Fine fibers between 0.07 and 3.0 μm typically have the capability to yield both low pressure drop and high efficiency. However, when used alone, these fibers may lack the structural characteristics required to maintain the desired shape of the filter element without collapse or burst. Thus, in some embodiments, a combination of fine fibers and coarser structural fibers is preferred. This can be accomplished in several ways, including, but not limited to, using:

1. A layer of fine fibers bonded to or supported by a substrate of structural fibers, e.g., meltblown polyester, other polymeric fibers, microglass, cellulose or other suitable structural fibers. This may be achieved by electrospinning or otherwise producing and laying down a nanofiber layer onto a substrate of filter media composed of coarser fibers, such as 3 to 30 μm polyester fibers. The nanofiber layer typically has the capability to yield both low pressure drop and high efficiency. The structural fibers provide support, and may allow for pleating and processing. The two layers may be attached to one another through ultrasonic bonding, the use of adhesives, physical constraints, or simply by allowing the freshly produced, warm, tacky, unsolidified nanofibers to cool and adhere to the support fibers.
2. A parent filter media composed primarily of coarser structural fibers greater than 1 μm, 10 μm, or 20 μm, meltblown polyester FWS media, microglass, and impregnated with carbon nanotubules smaller than 0.3 μm in diameter. The substrate material may be polymeric, e.g., polyester, nylon, polypropylene, polyphenylene sulfide, polyurethane, fluorocarbon, a thermoplastic polymer, or other polymeric material that can be formed into a non-woven fibrous or other porous structure. The substrate may be formed into a non-woven fibrous structure by wet laying, melt blowing, melt spinning, or other suitable process. The substrate media is then processed such that carbon nanotubules are incorporated into the media to bridge the micropores formed by the coarse fibers with carbon nanotubule nanofibers, such as described in U.S. Pat. Nos. 7,211,320 and 7,419,601 (which are incorporated herein by reference in their entireties); by thermally bonding the nanotubules to the parent media; or through the use of resin or other binders to attach the nanotubules to the parent media.

Non-woven filter media typically comprises pores and fibers of a range of different sizes. For high removal efficiency coalescence (e.g., greater than ~98%), the range of M preferably is controlled. As discussed above for equation (1), M is the mean pore size of the media material. Mean pore size may be determined by a porometer. For high efficiency coalescers, the maximum pore size, $M_M$, preferably is controlled. Specifically, the ratio of $M_M$ to M, the pore size ratio, preferably meets the criteria $$1 \le \frac{M_M}{M} \le 3 \quad (9)$$

Control of this ratio is important to the design of a high efficiency, single layer surface coalescers, since the flow of the emulsion will tend to preferentially pass through larger, more open pores, as opposed to smaller, more restrictive pores in the media. Thus, high removal efficiency preferably includes controlling the maximum pore size, where it is preferably that the maximum pore size is close to the mean pore size. As a previously unrecognized secondary benefit, a media that has a pore size ratio that is close to 1 will have a narrower pore size distribution and a more uniform surface that is easier for drops to drain from. In some embodiments, calendaring may be used to produce a smoother surface for the media material. This may facilitate drainage of coalesced drops to drain from the media. Therefore, in preferred embodiment, the pore size ratio for the media material is less than 3, more preferably less than 2, and even more preferably approaches 1.

Figure 5:
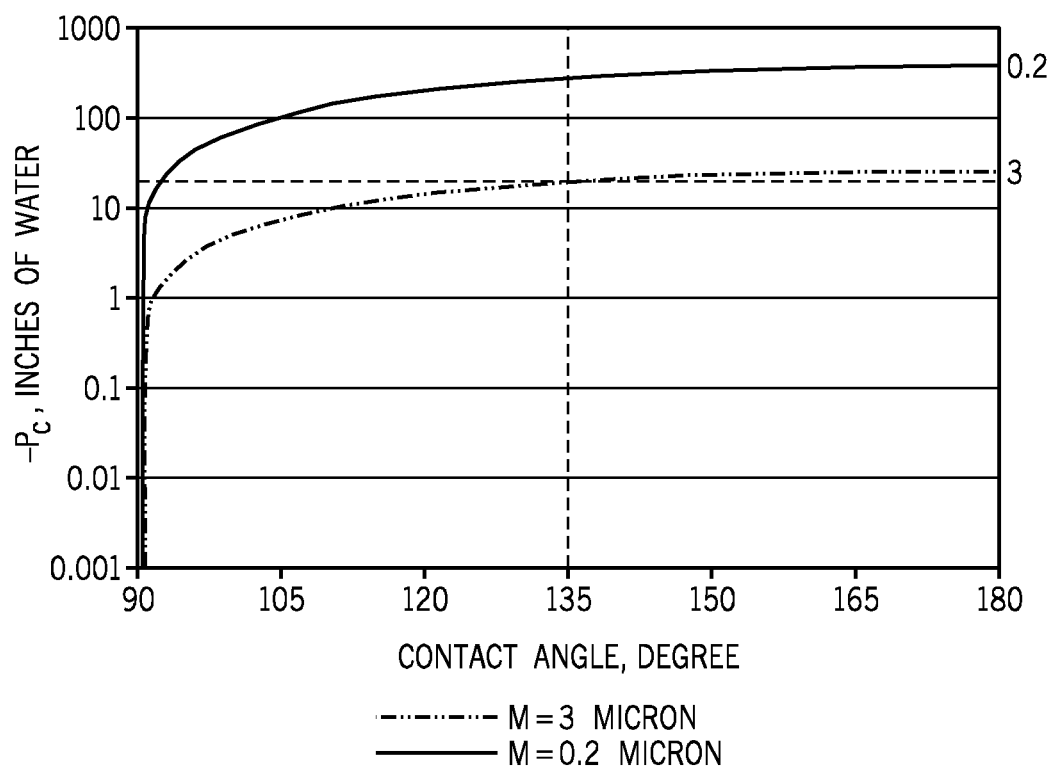
FIG. 5 illustrates the relationship between capillary pressure and contact angle for different pore sizes of the layer of the coalescing media disclosed herein.

In addition to these physical characteristics, the contact angle of a drop in the continuous phase on the media may be an important characteristic. In preferred embodiment, the pressure drop of the filter does not exceed ~20 inches of water. FIG. 5 shows the dependence of $P_C$ on θ using equations 1 and 2 for an embodiment of the media material having pore sizes of 0.2 and 3 μM. In this embodiment, θ≥120°, and, ideally, θ≥135° in order to retain drops for surface coalescence and to prevent passage of droplets through the media material. A highly non-wetting θ may be obtained in a number of commercially available ways to achieve non-wetting properties of the surface of the media material. For fuel water separators and other applications where water is the dispersed phase and a hydrocarbon liquid is the continuous phase (e.g., lube or hydraulic oil), the media material typically is hydrophobic and methods for obtaining a hydrophobic media material include, but are not limited to:

1. use of polymeric fibers with inherently hydrophobic properties, such as fluorocarbon fiber (e.g., Halar®ECTFE (a copolymer of ethylene and chlorotrifluoroethylene), polytetrafluoroethylene, or other fluorocarbon polymer), polyester (e.g., polybutylene terphthalate or other hydrophobic polyester), polypropylene, polyethylene, polyphenylene sulfide, polysulfone, acetal, and the like.

2. treatment of a base polymer, glass, metal, ceramic, or carbon fiber media with fluorocarbon or silicone resins, or surfactants (e.g., Rain-X® brand glass treatment) to impart hydrophobicity
3. plasma treatment of the media with a plasma containing fluorine substituents such as are described in U.S. patent application Ser. No. 12/247,502 and in *Plasma Surface Modification and Plasma Polymerization*, N. Inagaki, CRC Press, NY, 1996, which contents are incorporated herein by reference in their entireties.

For crankcase ventilation, similar methods may be used. However, preferably, the resultant surface is oleophobic. For example, the surface may include fluorocarbon functionalities. In applications of the coalescing media for removing oil or non-polar droplets from water, coolants, or other polar fluids, an oleophobic or hydrophilic surface may be obtained by methods that include, but are not limited to:

1. use of mineral oxide (e.g., glass, silica, ceramic), metal or polymeric fibers with inherently hydrophillic properties, such as nylon 6,6 or other hydrophilic polyamides, glass or ceramic, hydrophilic polyurethanes, polyvinyl alcohols, other hydrophilic polymers or oleophobic fluorocarbon media.
2. plasma treatment of the media with a plasma containing fluorine, oxygen, or nitrogen substituents, such as described in *Plasma Surface Modification and Plasma Polymerization*, N. Inagaki, CRC Press, NY, 1996, which content is incorporated herein by reference in its entirety.

In some embodiments, the orientation of the disclosed coalescing media in a coalescer is important for optimal function. Drainage will be vertically downward in the direction of gravity or may be facilitated by drag forces from the flowing continuous phase. Typically, the desired direction of drop transport does not oppose gravity.

Figure 6:
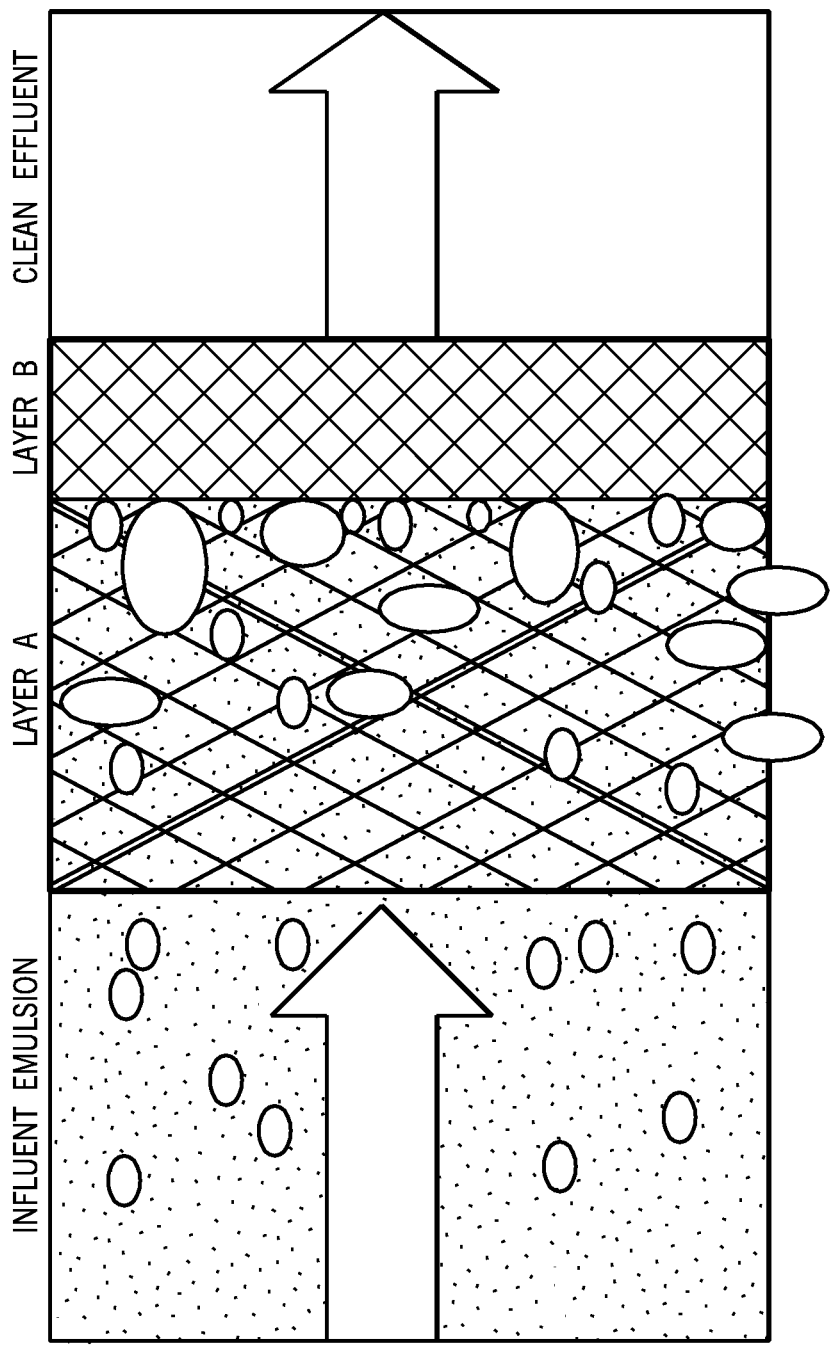
FIG. 6 provides a conceptual illustration of a surface coalescence process as contemplated herein.

In some embodiments, the disclosed surface coalescing media comprises or consists of a single layer of coalescing media material. In other embodiments, the disclosed coalescing media includes upstream drainage/prefilter layer (e.g., "Layer A") in addition to a layer of coalescing media material (e.g., "Layer B"). One embodiment of a surface coalescer is illustrated in FIG. 6, which performs as follows:

1. Contaminated fluid consisting of droplets (dispersed phase) suspended in a second immiscible fluid (continuous phase), which may or may not also contain solid particulates flow through the first layer of media.
2. In the first layer of media (which may be referred to as "Layer A") some of the droplets and solid particulates, primarily the larger ones, are captured, and retained.
3. Droplets and solid particulates not captured by Layer A flow are retained on or near the upstream surface of the second layer (which may be referred to as "Layer B") that acts as a barrier that prevents them from flowing through and concentrates the droplets.
4. Filtered, cleaned continuous phase exits Layer B.
5. As the local concentration of captured droplets on the surface of Layer B increases, they coalesce and grow which is facilitated by the presence of relatively wetting Layer A.
6. Coalesced drops from the surface of Layer B are repelled by the relatively non-wetting surface and optionally are wicked back into Layer A (e.g., where the contact angle of Layer A is less than about 90°), or alternatively, the coalesced drops may drain down the face of the non-wetting surface of Layer B.
7. As the dispersed phase wetting surface of Layer A becomes saturated, dispersed phase drains it under the influence of gravity, pressure or other force.
8. Drainage of the coalesced and wicked dispersed phase also rinse some of the capture solid particulates from the media.

The downstream layer (Layer B) has three basic functions similar to the single layer of media material discussed above.

1. to prevent droplets (and solid particles) larger than a certain size from passing through,
2. to facilitate coalescence by concentrating the retained droplets on its upstream surface, and
3. to facilitate release of drops and droplets from the surface.

The downstream layer (Layer B) may share one or more characteristics of the single layer of media material as discussed above. The characteristics of the downstream layer (Layer B) may be determined or modulated based on the equations discussed above for the single layer of media material.

The optional first layer, i.e., "Layer A," typically serves a different function than the second layer, i.e., "Layer B." Typically, the function of Layer A is to:

1. provide a region of higher capillary pressure than Layer B and optionally to assist in wicking captured and coalesced drops and droplets away from the surface of Layer B,
2. facilitate drainage of captured and coalesced drops and droplets from the media,
3. facilitate coalescence of captured droplets, and
4. optionally, serve as a prefilter for solids or other contaminants that may prematurely plug the media.

In order to facilitate wicking and coalescence of captured droplets, the first layer preferentially is more wettable by the dispersed phase than the second layer. Drainage of the dispersed phase, including drops and droplets from this layer typically is facilitated by having a large pore size. Where it is desirable that Layer A function as a pre-filter, it is further preferably that the pore size of Layer A be larger than that of Layer B. In a preferred design, a multilayer or multimedia pre-filter may precede Layer A (i.e., be upstream of Layer A) in order to maximize the life and extend the service interval of the media disclosed herein.

Layer A typically has a capillary pressure that is greater than Layer B, in order to wick away drops from the surface of Layer B. Preferably Layer A has a $P_C$, that is less than the pressure drop across the coalescer, thus $$P_{C,A} \leq \Delta P \tag{10}$$

and $$P_{C,B} \leq P_{C,A} \tag{11}$$

Figure 7:
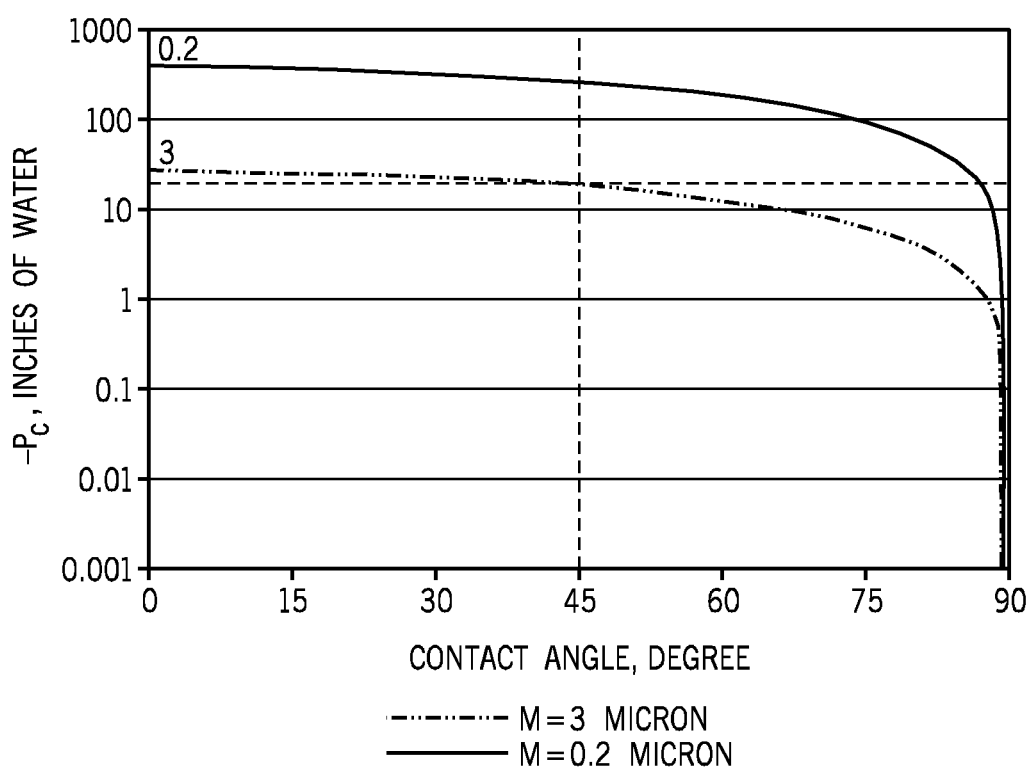
FIG. 7 illustrates the relationship between capillary pressure and contact angle for different pore sizes of the first layer of the coalescing media disclosed herein.

The greater the magnitude of $P_C$, the more readily the dispersed phase will wick away from Layer B. In view of Equations (1) and (10), it is preferred that Layer A preferentially be wetted by the dispersed phase (e.g., where $\theta \leq 90°$, and preferentially $\theta \leq 60°$, more preferentially $\theta \leq 45°$). FIG. 7 shows that for $\theta \leq 45°$, the value of $P_C$ begins to plateau and approach a maximum.

For fuel-water coalescers and other applications where water is the dispersed phase and a hydrocarbon liquid is the continuous phase (e.g., lube or hydraulic oil), Layer A is relatively hydrophilic compared to Layer B. Methods to achieve relatively hydrophilic surfaces are described above.

For crankcase ventilation and for the removal of oil or non-polar droplets from water, coolants, or other polar fluids, similar methods may be utilized. However, typically Layer A is relatively oleophilic compared to Layer B and methods to achieve oleophilic surfaces are described above.

Figure 8:
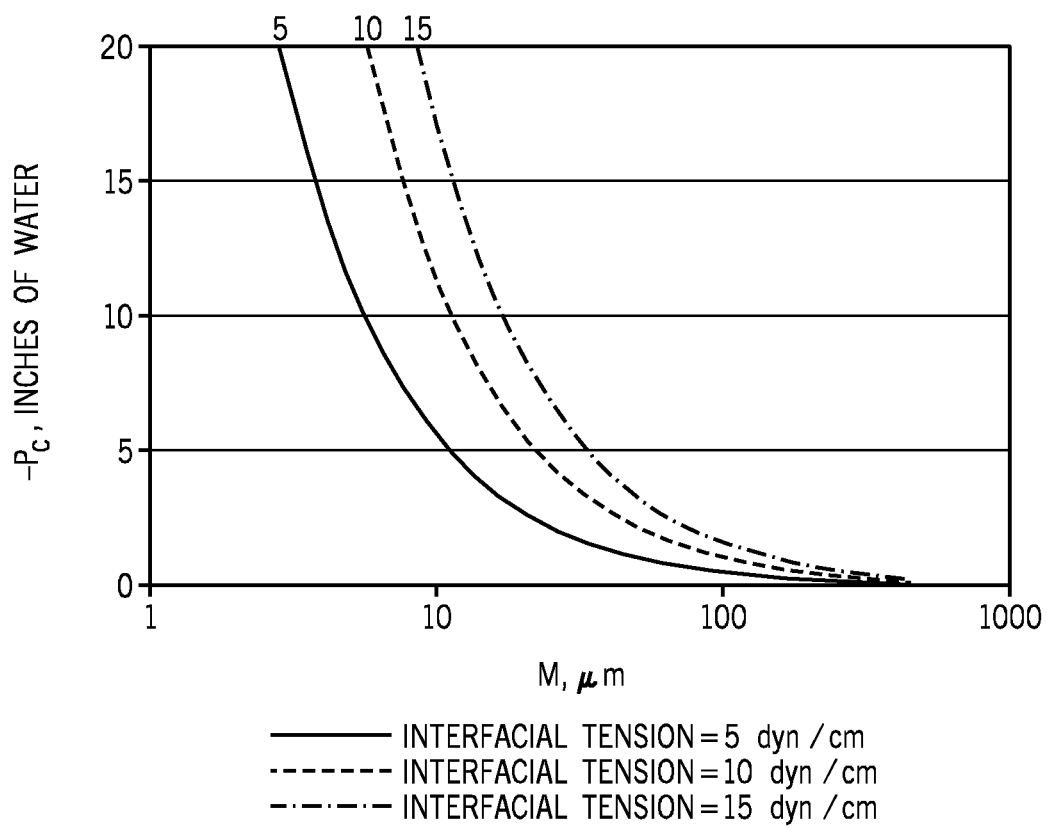
FIG. 8 illustrates the relationship between capillary pressure and pore size for different interfacial tensions.

In some embodiments, Layer B may comprise PBT with 1-10% (w/w) of a fluorocarbon additive, a polyester material compounded with 10-40% (w/w) of a fluorocarbon polymer, or 100% meltblown/fiber grade ECTFE In some embodiments, the orientation of the disclosed coalescing media in a coalescer is important for optimal function. Drainage will be vertically downward in the direction of gravity. Wicking, will typically involve horizontal transport of droplets from the surface of Layer B, but other orientations are possible. Typically, the desired direction of drop transport for wicking does not oppose gravity. As long as Layer A is preferentially wetting, wicking should occur, even if M is so large that there is negligible capillary pressure. However, in some embodiments, M may be an important design consideration for drainage. For example, if M is too small, $P_C$ will tend to oppose drainage, and may cause a buildup of coalesced drops within Layer B and excessive pressure drop. In this case, it may be desirable to minimize $P_C$ within the constraints of equation (10) while still optimizing wicking. FIG. 8 uses equation (1) to illustrate the effect of M on $P_C$ for various γ. In general, for fuel-water separation it may be desirable that $P_C \leq 5$ inch of water, and ideally that $P_C \leq 1$ inch of water. In order to function over a range of γ from 5 to 15 dyn/cm, preferably M≥30 μm for Layer A and, ideally M≥180 μm for Layer A. Using equation (7), this implies that d≤100 μm for Layer A, and ideally, d≤20 μm for Layer A, in order achieve preferable M and a values.

In some embodiments, Layer A may comprise fibers that are substantially oriented in a vertical direction (e.g., in an axis that is parallel to gravity). For example, Layer A may comprises fibers that are substantially oriented in a vertical direction at the downstream surface or face of Layer A that is adjacent to the upstream surface or face of Layer B (see FIG. 6) in order to facilitate drainage of droplets from the surface of Layer B. Media material for Layer A having fibers that are substantially oriented in a vertical direction may be prepared by subjecting a surface of the media material to a "carding" process which parallelizes the fibers of the surface. In some embodiments, media that comprises fibers that are substantially oriented in a vertical direction (e.g., fibers on a downstream surface or face) means media wherein at least about 70%, 80%, or preferably 90% of the fibers are substantially vertical (e.g., deviating from a vertical axis by no more than 30, 20, or preferably 10 degrees). In further embodiments, the upstream surface of Layer B may be relative smooth, for example, where the surface has been subject to a calendaring process.

The physical and wetting characteristics of the surface coalescer may be achieved as follows. The surface coalescer may comprise two distinct filter media with the specified properties held in intimate physical contact by pleating, pressure, adhesives, bonding resins, ultrasonic bonding, thermal bonding or other means. Alternatively, the surface coalescer may comprise a single multilayer media, such as formed by melt-blowing two different layer of media, once of top of another, by a wet laid process, electrospinning, melt-spinning, or other means or combination of means or processes.

Illustrative Embodiments

The following embodiments are illustrative and are not intended to limit the scope of the claimed subject matter.

Embodiment 1. A coalescer comprising coalescing media for coalescing a mixture of two phases, namely a continuous phase comprising hydrocarbon liquid and a dispersed phase comprising water, the mixture flowing through the media from upstream to downstream, the media comprising a layer of media material for filtering the mixture, the media material having a mean pore size, M, wherein the dispersed phase comprises water droplets having a average particle size that is greater than the mean pore size, the media material being relatively non-wettable with respect to the dispersed phase, the coalescer configured for filtering the mixture as it flows from upstream to downstream in the coalescer, capturing droplets of the dispersed phase at an upstream face of the media material, and coalescingly growing the droplets into larger drops which further coalesce and grow to a sufficient size whereby they drain from the upstream face and are released from the coalescer.

Embodiment 2. The coalescer according to embodiment 1, wherein 0.2 μm≤M≤12.0 μm (preferably 2.0 μm≤M≤10.0 μm, more preferably 4.0 μm≤M≤8.0 μm).

Embodiment 3. The coalescer according to embodiment 1 or 2, wherein the media material has a maximum pore size $M_M$ and $1 \leq M_M/M \leq 3$.

Embodiment 4. The coalescer according to any of embodiments 1-3, wherein the media material comprises fibers having a mean diameter between 0.07 μm and 3 μm (preferably between 0.15 μm and 1.5 μm).

Embodiment 5. The coalescer according to embodiment 4, wherein the fibers comprise polyester material or polyamide material.

Embodiment 6. The coalescer according to any of embodiments 1-5, wherein the media material further comprises coarse fibers with a mean diameter greater than 1 μm (preferably greater than 10 μm, more preferably greater than 20 μm).

Embodiment 7. The coalescer according to embodiment 6, wherein the coarse fibers comprise a hydrophobic polymer which optionally is ECTFE.

Embodiment 8. The coalescer according to any of embodiments 1-7, wherein the media material has a thickness as measured from upstream to downstream of between 0.05 and 0.4 mm (preferably 0.1 and 0.3 mm).

Embodiment 9. The coalescer according to any of embodiments 1-8, wherein the contact angle for a drop of dispersed phase in the continuous phase on the media material is no less than 90° (preferably no less than 120°, more preferably no less than 135°).

Embodiment 10. The coalescer according to any of embodiments 1-9, wherein the media material has a porosity ε that is no less than 0.8.

Embodiment 11. The coalescer according to any of embodiments 1-10, comprising an additional layer of media material adjacent to the upstream face of the media material, the adjacent layers extending in series from upstream to downstream, namely an upstream first layer of media material and a downstream second layer of media material, the first layer of media material being relatively wettable by the dispersed phase in the continuous phase, and the first layer and the second layer having mean pore sizes $M_1$ and $M_2$, respectively, and $M_1 > M_2$.

Embodiment 12. The coalescer according to embodiment 11, wherein $M_1$ is at least about 2.5 times greater than $M_2$.

Embodiment 13. The coalescer according to embodiment 11 or 12, wherein $M_1 \geq 20$ μm (preferably $M_1 \geq 30$ μm).

Embodiment 14. The coalescer according to any of embodiments 11-13, wherein 0.2 µm≤$M_2$≤12.0 µm (preferably 2.0 µm≤$M_2$≤10.0 µm, more preferably 4.0 µm≤$M_2$≤8.0 µm).

Embodiment 15. The coalescer according to any of embodiments 11-14, wherein the first layer comprises media having an average fiber diameter that is greater than about 1 µm, 10 µm, or 20 µm, and less than about 100 µm.

Embodiment 16. The coalescer according to any of embodiments 11-15, wherein the contact angle for a drop of dispersed phase in the continuous phase on layer one, $\theta_1$, is no more than 90° (preferably no more than 60°, more preferably no more than 45°) and the contact angle for a drop of dispersed phase in the continuous phase on layer two, $\theta_2$, is no less than 90° (preferably no less than 120°, more preferably no less than 135°).

Embodiment 17. The coalescer according to any of embodiments 11-16, wherein the first layer of media material has a downstream surface that comprises fibers that are oriented in a substantially vertical direction.

Embodiment 18. The coalescer according to any of embodiments 11-17, wherein the coalescing media is formed by obtaining a first media material and a second media material and physically or chemically coupling the first media material and the second media material in layers.

Embodiment 19. The coalescer according to any of embodiments 11-17, wherein the coalescing media is formed by melt-blowing the first media material and the second media material in layers.

Embodiment 20. The coalescer according to any of embodiments 11-19 contained in a housing, the housing having an upstream inlet structured to receive the mixture and a downstream outlet structured to discharge the mixture after coalescing of the dispersed phase.

Embodiment 21. A coalescing system comprising the coalescer according to embodiment 20.

Embodiment 22. The coalescing system according to embodiment 21, configured for removing water dispersed in hydrocarbon fuel.

Embodiment 23. The coalescing system according to embodiment 21 or 22, further comprising a hydrophobic media for removing water positioned downstream of the coalescing element.

Embodiment 24. The coalescing system according to any of embodiments 21-23, further comprising an additional device for removing water positioned downstream of the coalescing element, the device selected from a group consisting of gravity separator, centrifuge, impactor, lamella separator, inclined stacked plate, screen, and quiescent chamber.

Embodiment 25. A method of removing water dispersed in hydrocarbon fuel, the method comprising passing a mixture comprising hydrocarbon fuel and water dispersed in the hydrocarbon fuel through the coalescer or coalescing system of any of embodiments 1-24 and removing at least about 93%, 95%, 97%, or 99% of water dispersed in the hydrocarbon fuel.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible. The afore-cited patents and published applications are incorporated herein by reference in their entireties.

What is claimed is:

1. A coalescer comprising:
coalescing media for coalescing a mixture of two phases, namely a continuous phase comprising hydrocarbon liquid and a dispersed phase comprising water, the mixture flowing through the media from upstream to downstream, the media comprising a layer of media material for filtering the mixture, the media material having a mean pore size, M, wherein the dispersed phase comprises water droplets having an average particle size that is greater than the mean pore size, the media material being relatively non-wettable with respect to the dispersed phase, wherein 0.2 µm≤M≤12.0 µm and the media material has a maximum pore size $M_M$ and 1≤$M_M$/M≤3; and
an additional layer of media material adjacent to the upstream face of the media material, the adjacent layers extending in series from upstream to downstream, namely an upstream first layer of media material and a downstream second layer of media material, the first layer of media material being relatively wettable by the dispersed phase in the continuous phase, and the first layer and the second layer having mean pore sizes $M_1$ and $M_2$, respectively, and $M_1$>$M_2$,
wherein the coalescer is configured to filter the mixture as it flows from upstream to downstream in the coalescer.

2. The coalescer according to claim 1, wherein the media material comprises fibers having a mean diameter between 0.07 µm and 3 µm.

3. The coalescer according to claim 2, wherein the fibers comprise polyester material.

4. The coalescer according to claim 2, wherein the media material further comprises coarse fibers with a mean diameter greater than 10 µm.

5. The coalescer according to claim 4, wherein the coarse fibers comprise a hydrophobic polymer which optionally is ethylene chlorotrifluoroethylene (ECTFE).

6. The coalescer according to claim 1, wherein the media material has a thickness measured from upstream to downstream between 0.05 and 0.3 mm.

7. The coalescer according to claim 1, wherein the contact angle for a drop of dispersed phase in the continuous phase on the media material is no less than 90°.

8. The coalescer according to claim 1, wherein the media material has a porosity that is no less than 0.8.

9. The coalescer according to claim 1, wherein $M_1$ is at least about 2.5 times greater than $M_1$.

10. The coalescer according to claim 1, wherein $M_1$≥30 µm.

11. The coalescer according to claim 1, wherein 0.2 µm≤$M_2$≤12.0 µm.

12. The coalescer according to claim 1, wherein the first layer comprises media having an average fiber diameter that is less than about 100 µm.

13. The coalescer according to claim 1, wherein the contact angle for a drop of dispersed phase in the continuous phase on layer one, $Ø_1$, is no more than 90° and the contact angle for a drop of dispersed phase in the continuous phase on layer two, $Ø_2$, is no less than 90°.

14. The coalescer according to claim 1, wherein the first layer of media material has a downstream surface that comprises fibers that are oriented in a substantially vertical direction.

15. The coalescer according to claim 1, wherein the coalescing media is formed by obtaining a first media material and a second media material and physically or chemically coupling the first media material and the second media material in layers.

16. The coalescer according to claim 1, wherein the coalescing media is formed by melt-blowing the first media material and the second media material in layers.

17. The coalescer according to claim 1 contained in a housing, the housing having an upstream inlet structured to receive the mixture and a downstream outlet structured to discharge the mixture after coalescing of the dispersed phase.

18. A coalescing system comprising the coalescer according to claim 17.

19. The coalescing system according to claim 18, configured for removing water dispersed in hydrocarbon fuel.

20. The coalescing system according to claim 19, further comprising a hydrophobic media for removing water positioned downstream of the coalescing element.

21. The coalescing system according to claim 19, further comprising an additional device for removing water positioned downstream of the coalescing element, the device selected from a group consisting of gravity separator, centrifuge, impactor, lamella separator, inclined stacked plate, screen, and quiescent chamber.

22. A coalescer comprising:
coalescing media for coalescing a mixture of two phases, namely a continuous phase comprising hydrocarbon liquid and a dispersed phase comprising water, the mixture flowing through the media from upstream to downstream, the media comprising a layer of media material for filtering the mixture, the media material having a mean pore size, M, wherein the dispersed phase comprises water droplets having an average particle size that is greater than the mean pore size, the media material being relatively non-wettable with respect to the dispersed phase, wherein 0.2 µm≤M≤12.0 µm and the media material has a maximum pore size $M_M$ and $1 \leq M_M/M \leq 3$, the media material comprises first fibers;
wherein the coalescer is configured to filter the mixture as it flows from upstream to downstream in the coalesce
wherein the first fibers have a mean diameter between 0.07 µm and 3 µm.

23. The coalescer according to claim 22, wherein the first fibers comprise polyester material.

24. The coalescer according to claim 22, wherein the media material further comprises coarse fibers with a mean diameter greater than 10 µm.

25. The coalescer according to claim 24, wherein the coarse fibers comprise a hydrophobic polymer which optionally is ethylene chlorotrifluoroethylene (ECTFE).

26. A coalescer comprising:
coalescing media for coalescing a mixture including a continuous phase comprising hydrocarbon liquid and a dispersed phase comprising water, the mixture flowing through the media from upstream to downstream, the media including a layer of media material for filtering the mixture, the media material having a mean pore size ("M") and a maximum pore size ("$M_M$") wherein the dispersed phase comprises water droplets having an average particle size that is greater than the mean pore size, the media material being relatively non-wettable with respect to the dispersed phase, wherein 0.2 µm≤M≤12.0 µm and the media material has a maximum pore size $M_M$, a ratio of $M_M$ to M is less than three and approaches one; and
an additional layer of media material adjacent to an upstream face of the media material, the adjacent layers extending in series from upstream to downstream, namely an upstream first layer of media material and a downstream second layer of media material, the first layer of media material being relatively wettable by the dispersed phase in the continuous phase, and the first layer and the second layer having mean pore sizes $M_1$ and $M_2$, respectively, and $M_1 > M_2$.

* * * * *